US008218173B2

(12) United States Patent
Kuroshima

(10) Patent No.: US 8,218,173 B2
(45) Date of Patent: Jul. 10, 2012

(54) PRINTING SYSTEM, CONTROL METHOD THEREFOR, AND PROGRAM FOR PROVIDING END NOTIFICATIONS RELATED TO MERGED JOBS

(75) Inventor: Masashi Kuroshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1334 days.

(21) Appl. No.: 11/740,512

(22) Filed: Apr. 26, 2007

(65) Prior Publication Data

US 2007/0297003 A1 Dec. 27, 2007

(30) Foreign Application Priority Data

May 10, 2006 (JP) .................................. 2006-131811

(51) Int. Cl.
*G06F 3/12* (2006.01)
*G06K 15/00* (2006.01)
(52) U.S. Cl. ..................................... 358/1.15; 358/1.18
(58) Field of Classification Search .................. 358/1.15, 358/1.18
See application file for complete search history.

(56) References Cited

U.S. PATENT DOCUMENTS

| 7,639,386 | B1* | 12/2009 | Siegel et al. | 358/1.18 |
| 2003/0084114 | A1* | 5/2003 | Simpson et al. | 709/216 |
| 2005/0052659 | A1* | 3/2005 | Jacobsen et al. | 358/1.1 |
| 2006/0274361 | A1* | 12/2006 | Kobayashi et al. | 358/1.15 |

FOREIGN PATENT DOCUMENTS

| JP | 2000-200226 | 7/2000 |
| JP | 2004-248317 A | 9/2004 |
| JP | 2005-102045 | 4/2005 |
| JP | 2006-209408 | 8/2006 |

\* cited by examiner

*Primary Examiner* — Benny Q Tieu
*Assistant Examiner* — Sunil Chacko
(74) *Attorney, Agent, or Firm* — Fitzpatrick, Cella, Harper & Scinto

(57) ABSTRACT

In a printing system having a plurality of process apparatuses for executing processes from printing to bookbinding, each process apparatus receives, from an upstream process apparatus, a merged job obtained by merging a plurality of jobs. The process apparatus processes the merged job on the basis of job management information representing the process contents of the received merged job. The process apparatus then transmits, to a designated destination, the end notification of the process by a processing unit for each of the jobs in the merged job.

6 Claims, 34 Drawing Sheets

F I G. 6
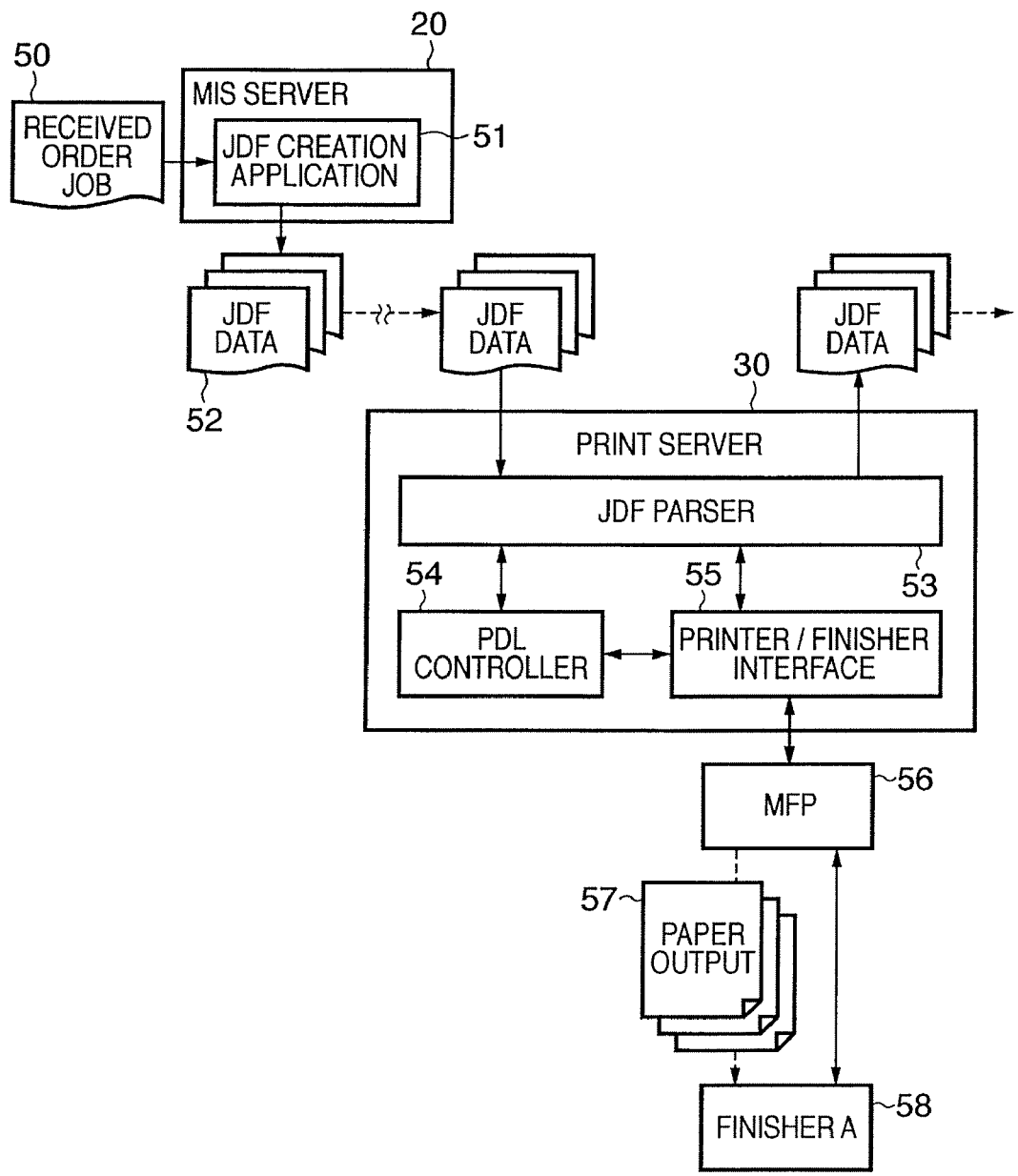

【DIGITAL PRINTING SECTION】

[DIGITAL PRINTING SECTION]

PRINTING SYSTEM, CONTROL METHOD THEREFOR, AND PROGRAM FOR PROVIDING END NOTIFICATIONS RELATED TO MERGED JOBS

BACKGROUND OF THE INVENTION

1. Field of the Invention

The present invention relates to a printing system which generates a final product using a plurality of process apparatuses for executing processes from printing to bookbinding, a process apparatus, a job management apparatus, a control method therefor, and a program.

2. Description of the Related Art

A commercial printing business receives an order of a creation request of printed materials (e.g. a magazine, newspaper, brochure, advertisement, and gravure) from a third party (customer or client), creates printed materials desired by the client, and delivers them to the client so as to get a reward. The commercial printing business still prevalently uses a large-scale printing device such as an offset prepress & press even today.

Such commercial printing businesses proceed with operations via various processes. Such processes include, for example, document reception, design & layout, comprehensive layout (presentation by means of printer output), proofing (layout correction & color correction), proof print, artwork preparation, print, post-process, and shipping.

Meanwhile, in recent years, along with the advent of high-speed, high-quality electro-photographic printing apparatuses and inkjet printing apparatuses, a so-called print-on-demand market exists in competition with the aforementioned printing business. Print-on-demand will be abbreviated as POD hereinafter.

The POD aims at handling the print process within a short delivery period by dividing a job to be handled by a printing apparatus into those of relatively smaller lots without using any large-scale apparatus or system. Especially, this POD implements digital printing using digital data by fully utilizing a digital image forming apparatus such as a digital copying machine, digital multifunction peripheral, and the like in place of the large-scale printing press and printing scheme. A POD market as a POD-based business category has been developed. Such POD market and effectively utilizes computerized management and control.

The POD system merges (combines) a plurality of print jobs into one print job (gang job), and cuts the resultant printed material into those corresponding to the respective print jobs.

There is known a technique of sending a job end notification to a client computer (serving as a host apparatus) which has input a job when an image forming apparatus ends the print process (e.g., Japanese Patent Laid-Open No. 2000-200226).

It is well known to bind (e.g., staple, punch, saddle-stitch, or case-bind) document sheets output from a conventional image forming apparatus using a finishing apparatus.

The conventional technique related to the end notification in Japanese Patent Laid-Open No. 2000-200226 sends a job end notification every time the job in process ends.

Assume that users A to C generate print jobs of a gang job. When the POD system processes a gang job by applying the conventional job end notification technique, it sends an end notification to clients operated by users A to C upon completion of all the processes of the gang job.

In other words, when processing a gang job of merged jobs, like the POD system, the user of a job submitted first as part of the gang job cannot receive any end notification of his job until all the processes of the gang job end. Also, the user of the first submitted job cannot receive any product (printed material) of the job until all the processes of the gang job end.

This is because the gang job handles a plurality of jobs as one job, and printing does not end till the completion of printing the final job in the gang job though printing of the first job in the gang job ends. Even if printing of the first job is complete, the user cannot recognize the completion of the first job before the entire gang job is complete.

SUMMARY OF THE INVENTION

The present invention has been made to address the conventional drawbacks, and has as its object to provide a printing system which generates a printed material via a plurality of process apparatuses and can increase the process efficiency, a process apparatus, a job management apparatus, a control method therefor, and a program.

According to one aspect of the present invention, a printing system comprising a job management apparatus, and a plurality of process apparatuses which execute processes from printing to bookbinding to generate a final product is provided. The job management apparatus comprises:

job merge means configured to merge a plurality of jobs to generate a merged job, and at least one of the process apparatuses comprising receiving means configured to receive the merged job;

processing means configured to process the merged job on the basis of job management information representing process contents of the merged job received by the receiving means; and notifying means configured to transmit, to a designated destination, an end notification of a process by the processing means for each of the plurality of jobs in the merged job.

In a preferred embodiment, at least one of the process apparatuses further comprises first generating means configured to generate notification instruction information to cause a process apparatus downstream of the one process apparatus to transmit, to a designated destination, an end notification of a process for each of the plurality of jobs in the merged job, and job transmitting means configured to transmit the job management information containing the notification instruction information generated by the first generating means to the downstream process apparatus together with the merged job.

In a preferred embodiment, the notifying means transmits, to a designated destination, an end notification every time the processing means ends a process for each of the plurality of jobs in the merged job on the basis of notification instruction information contained in the job management information of the merged job.

In a preferred embodiment, the job management apparatus comprises second generating means configured to generate job management information on the basis of process content information of the merged job, and notification instruction information to transmit, to a designated destination, an end notification of a process for each of the plurality of jobs in the merged job; and output means for outputting the merged job containing the job management information to a process apparatus designated among the process apparatuses.

According to another aspect of the present invention, a process apparatus for use in a printing system which generates a final product using a plurality of process apparatuses for executing processes from printing to bookbinding, is provided. The process apparatus comprises:

receiving means configured to receive a merged job obtained by merging a plurality of jobs from an upstream process apparatus which executes a process prior to the process apparatus;

processing means configured to process the merged job on the basis of job management information representing process contents of the merged job received by the receiving means; and notifying means configured to transmit, to a designated destination, an end notification of a process by the processing means for each of the plurality of jobs in the merged job.

In a preferred embodiment, a process apparatus further comprises:

generating means configured to generate notification instruction information to cause a process apparatus downstream from the process apparatus to transmit, to a designated destination, an end notification of a process for each of the plurality of jobs in the merged job; and job transmitting means configured to transmit the job management information containing the notification instruction information generated by the generating means to the downstream process apparatus together with the merged job.

In a preferred embodiment, the notifying means transmits, to a designated destination, an end notification every time the processing means ends a process for each of the plurality of jobs in the merged job on the basis of notification instruction information contained in the job management information of the merged job.

In a preferred embodiment, the process apparatus includes an image forming apparatus which forms an image on the basis of a job, or a post-processing apparatus which executes a post-process for a printed material output from the image forming apparatus.

According to still another aspect of the present invention, a job management apparatus which generates a job and job management information representing process contents of the job for a printing system that generates a final product using a plurality of process apparatuses for executing processes from printing to bookbinding, is provided. The job management apparatus comprises:

first generating means configured to generate a merged job by merging a plurality of jobs;

second generating means configured to generate job management information on the basis of process content information of the merged job, and notification instruction information to transmit, to a designated destination, an end notification of a process for each of the jobs of the merged job; and output means for outputting the merged job containing the job management information to a process apparatus designated among the process apparatuses.

According to yet another aspect of the present invention, a method of controlling a process apparatus for use in a printing system which generates a final product using a plurality of process apparatuses for executing processes from printing to bookbinding, is provided. The method comprises:

a receiving step of receiving a merged job obtained by merging a plurality of jobs from an upstream process apparatus which executes a process prior to the process apparatus;

a processing step of processing the merged job on the basis of job management information representing process contents of the merged job received in the receiving step; and a notifying step of transmitting, to a designated destination, an end notification of a process in the processing step for each of the plurality of jobs in the merged job.

According to still yet another aspect of the present invention, a method of controlling a job management apparatus which generates a job and job management information representing process contents of the job for a printing system that generates a final product using a plurality of process apparatuses for executing processes from printing to bookbinding, is provided. The method comprises:

a first generating step of generating a merged job by merging a plurality of jobs;

a second generating step of generating job management information on the basis of process content information of the merged job, and notification instruction information to transmit, to a designated destination, an end notification of a process for each of the plurality of jobs of the merged job; and an output step of outputting the merged job containing the job management information to a process apparatus designated among the process apparatuses.

Further features of the present invention will be apparent from the following description of exemplary embodiments with reference to the attached drawings.

BRIEF DESCRIPTION OF THE DRAWINGS

FIG. 6 is a view showing an example of a workflow implemented by a job ticket;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Prior to a description of embodiments of the present invention, an example of the configuration of a conventional POD system will be explained with reference to FIGS. 1 to 4. Contents to be described with reference to these drawings are directed to a general POD system, and such a POD system is sometimes used for other application purposes not described in the following embodiments. Use examples associated with these drawings will be explained in the embodiments.

Figure 1:
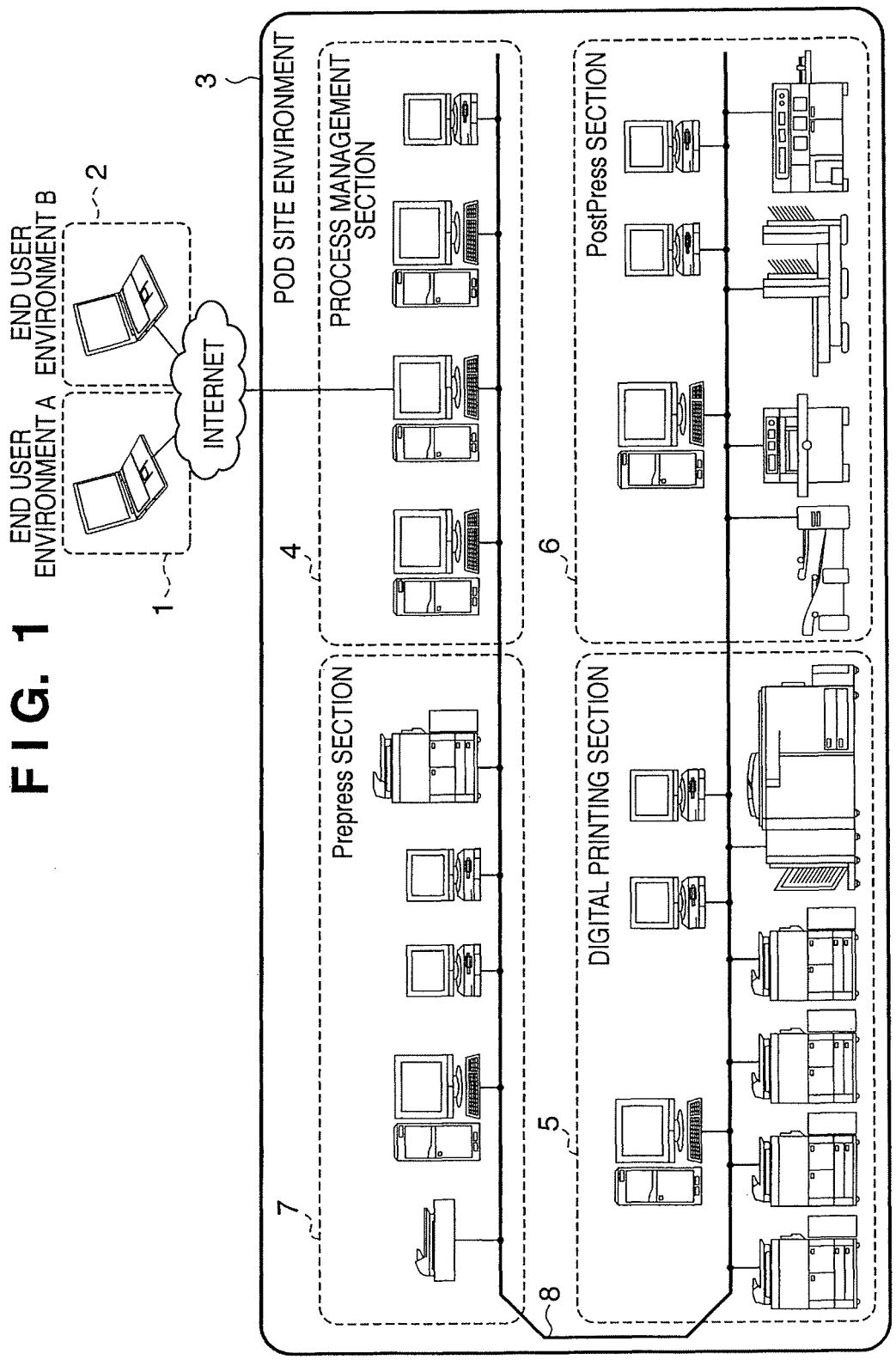
FIG. 1 is a block diagram showing an example of the basic configuration of an overall printing system.

FIG. 1 is a block diagram showing an example of the basic configuration of the overall printing system.

FIG. 1 shows an example of a POD (Print On Demand) system, and an example of the basic configuration of a printing system according to the present invention. The printing system adopts, for example, JDF data serving as management information (job management information) on various processes (jobs) including a Print process and various PostPress processes.

The printing system in the block diagram of FIG. 1 comprises one or a plurality of end user environments 1 and 2, and a POD site environment 3 connected via the Internet. Print ordering users exist in the end user environments 1 and 2. The users can use client PCs in the end user environments (in this case, end user environments A and B) to request a print job, check the job status, and the like.

The POD site environment 3 generally comprises a process management section 4 and digital printing section 5. The POD site environment 3 can further add a PostPress section 6 when the functions and capabilities of a finishing apparatus connected to a digital image forming apparatus such as a digital copying machine or digital multifunction peripheral in the digital printing section 5 are insufficient. The POD site environment 3 can further add a Prepress section 7 in accordance with application purposes. The process management section 4, digital printing section 5, PostPress section 6, and Prepress section 7 connect to each other via a network 8.

The process management section 4 designates work in processes by the digital printing section 5, PostPress section 6, and Prepress section 7 in the POD site environment, and centralizes the workflow of the system having computers and various devices. The process management section 4 receives and saves a job from a client PC in the end user environment. The process management section 4 composes work of each process into a workflow, and efficiently schedules work by each device or each operator on the basis of designation of a job from a client PC in the end user environment.

The Prepress section 7 uses a scanning device such as a scanner or MFP to scan a paper document received from an end user on the basis of a Prepress job work instruction received from the process management section 4. The Prepress section 7 inputs data of the paper document as a scanned image file to a Prepress server or client PC. In addition, the Prepress section 7 executes various processes such as image correction, file merge, page insertion/deletion, various page layout editing processes, and the imposition process. The Prepress section 7 also outputs a proof in order to check the layout and color tint of a final product, as needed.

The MFP stands for a multi function peripheral.

The digital printing section 5 uses a scanning & printing device to copy a paper document received from an end user in accordance with the work instruction of a print job received from the process management section 4 or Prepress section 7. Further, the digital printing section 5 prints out, to a printing device, a file received from a client PC via a printer driver or hot folder. Examples of the received file are a document/image file received from a client PC in the end user environment, a scanned image file obtained from a scanning device, and a document/image file obtained by editing these files. Examples of the scanning & printing device are a monochrome MFP and color MFP.

The PostPress section 6 controls post-processing apparatuses such as a paper folding machine, saddle stitcher, case binding machine, cutting machine, inserter, and collator in accordance with the work instruction of a PostPress job received from the process management section 4, Prepress section 7, or digital printing section 5. Also, the PostPress section 6 executes finishing processes such as paper folding, saddle stitching, case binding, cutting, insertion, and collation for a material printed out from the digital printing section 5.

[System Configuration of Process Management Section]

Figure 2:
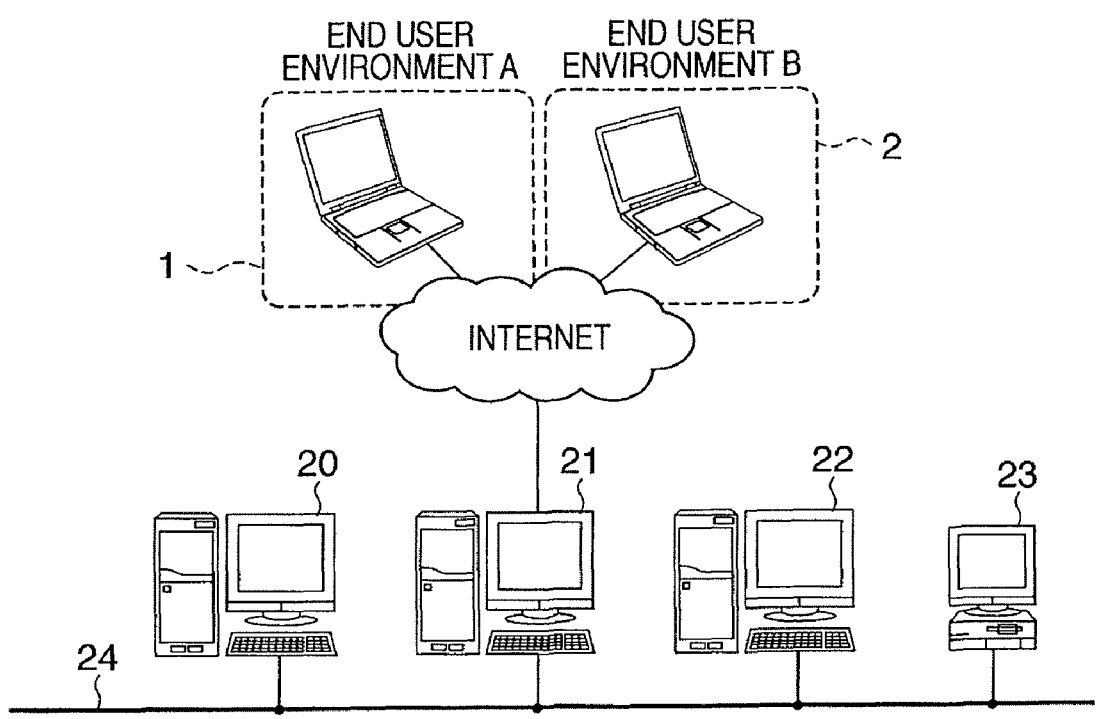
FIG. 2 is a view showing an example of the configuration of a process management section.

FIG. 2 is a view showing an example of the configuration of the process management section.

The process management section 4 comprises a MIS (Management Information System) server 20, order receiving server 21, file server 22, and client PC 23 which are connected to a network 24.

The MIS server 20 manages the workflow of the whole system from reception of an order to delivery, and comprehensively manages various kinds of management information and sales information.

The order receiving server 21 receives a job from a client PC in the end user environment 1 or 2 by using the Internet or other suitable communication channel. The order receiving server 21 manages the received job by its ID number. The order receiving server 21 transmits the ID number and information necessary for management to the MIS server 20, and also transmits them to downstream processes together with another information such as image data in accordance with an instruction from the MIS server 20.

The file server 22 is a document management server for saving a job received from a client PC in preparation for a reorder of the same document from a client PC in the end user environment 1 or 2. In general, the file server 22 saves image data and job setting information (job ticket) used for previous output together.

The MIS server 20, order receiving server 21, file server 22, and client PC 23 in the process management section 4 exchange information using, e.g., a job ticket called JDF which describes a job work instruction. The JDF transfers jobs and issues control commands to automate total workflow centered on the process management section 4 in cooperation with the Prepress section 7, digital printing section 5, Post-Press section 6, and the like.

JDF stands for Job Definition Format.

[System Configuration of Prepress Section]

Figure 3:
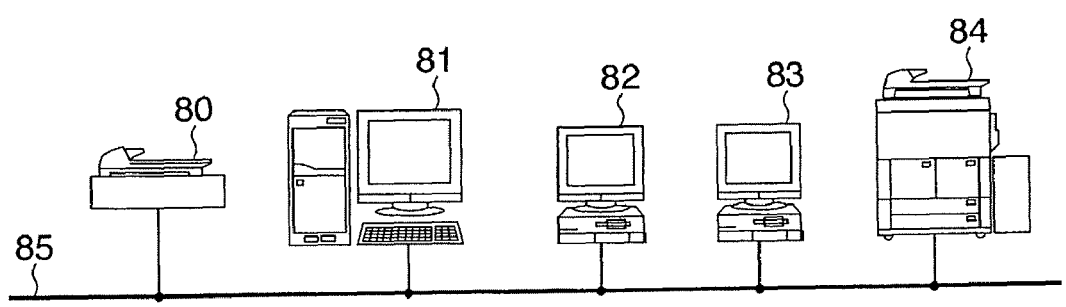
FIG. 3 is a view showing an example of the configuration of a Prepress section.

FIG. 3 is a view showing an example of the configuration of the Prepress section.

A Prepress server 81 uses a scanning device such as a scanner 80 or MFP 84 to scan a paper document and receive the data as a scanned image file. The Prepress server 81 executes image correction such as skew correction or black dot removal for the received scanned image file. The Prepress server 81 merges received document/image files and image files scanned by the scanning device. The Prepress server 81 executes the imposition process and various page layout editing processes such as page insertion/deletion, addition of a page number or annotation, insertion of an index sheet, cover sheet, or slip sheet, and designation of N-up printing or double copy.

The Prepress section 7 may be formed from one Prepress server 81, and client PCs 82 and 83, or from only the client PCs 82 and 83 without the Prepress server 81.

When the received job is a copy job, the operator scans a paper document with a scanning device such as the scanner 80 or MFP 84, and inputs the data as a scanned image file to the Prepress server 81 or the client PC 82 or 83. If the scanned image skews, the skew is corrected by executing skew correction. If the scanned image has a punch hole or dust, the punch hole or dust can be removed by executing black dot removal.

When the received job is a print job, the operator inputs a document/image file received from an end user to the Prepress server 81 or the client PC 82 or 83. When there are a plurality of received document/image files or a plurality of image files scanned by the scanning device, these files are merged.

When a received document/image file or an image file scanned by the scanning device needs to be further edited, for example, the operator can edit it while confirming the layout of pages. For example, the operator can insert a page from another file into a target file or delete a page of a target file.

The operator can add a page number or annotation (text or image such as a watermark or logotype representing confidential information), or designate N-up printing or double copy (printing to lay out a plurality of pages on one print plane). The operator can insert an index sheet, cover sheet, or slip sheet, or designate a post-process such as stapling, punching, or Z-folding. In this manner, the operator executes various page layout editing processes and the imposition process.

To implement one-to-one marketing of direct mail address printing or customer-specific brochure printing, the Prepress section 7 prints copies of a single document in cooperation with a database in the Prepress server 81 or another server. In parallel with this, the Prepress section 7 can also build a variable printing system which replaces the address and related data and prints them.

A printing business requires an output called a color comprehensive layout aimed at presentation to an advertising client before the prepress and press processes. A recent color comprehensive layout uses a color hard copy of a digital color image output from a color output device after being processed by DTP for creating a publication using a personal computer or CEPS used to modify or composite an image in the press process.

The DTP stands for Desk Top Publishing. The CEPS stands for Color Electronic Prepress System. The color output device includes a color MFP, color printer, and color plotter.

The POD using a color printer such as a color MFP can provide proof output for layout checking equivalent to a comprehensive layout, simple color tint checking, and detailed color tint checking equivalent to a proof. More specifically, a color printer such as a color MFP (or a monochrome printer such as a monochrome MFP) can output a proof.

If necessary, the Prepress section 7 can output a proof to the MFP in order to check the layout and color tint of a final product.

The Prepress server 81, client PCs 82 and 83, scanner 80, and MFP 84 in the Prepress section 7 connect to each other via a network 85. These devices process a job received by the Prepress section 7 by transferring the job and issuing a control command via the network 85.

[System Configuration of Digital Printing Section]

Figure 4:
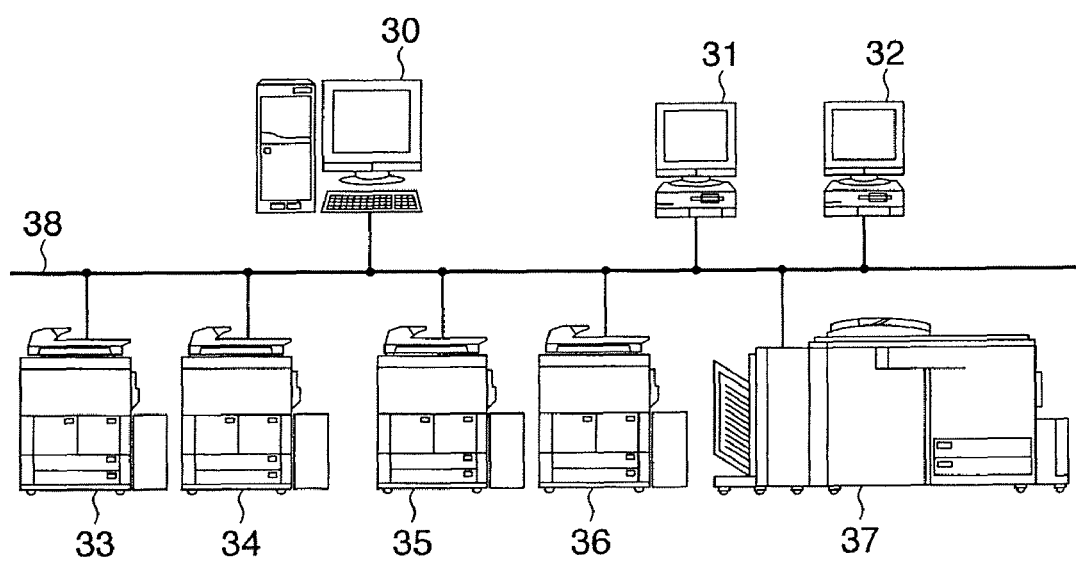
FIG. 4 is a view showing an example of the configuration of a digital printing section.

FIG. 4 is a view showing an example of the configuration of the digital printing section.

In FIG. 4, a print server 30, client PCs 31 and 32, monochrome MFPs 33 and 34, and color MFPs 35, 36, and 37 connect to a network 38. The number of devices of each type is arbitrary.

The print server 30 has two roles. One role is to transmit/receive information to/from outside the digital printing section 5. The print server 30 receives image information, setting information, and the like of a submitted job, and after the job ends, announces information such as the status outside the digital printing section 5. The other role is to manage and control devices in the digital printing section 5. The print server 30 centralizes externally input jobs and jobs generated in the digital printing section 5.

The print server 30 can monitor the statuses of all devices and all jobs in the digital printing section 5. Also, the print server 30 can control job suspension, setting change, print resume, job copy/movement/deletion, and the like.

The client PCs 31 and 32 have a role of editing an input application file, designating printing, and inputting a print ready file. The client PCs 31 and 32 also have a role of assisting monitoring and control of devices and jobs managed in the print server 30.

The monochrome MFPs 33 and 34, and the color MFPs 35, 36, and 37 are image forming apparatuses having various functions such as scanning, printing, and copying. The color MFP and monochrome MFP are different in speed, cost, and the like, and are selectively used in accordance with application purposes. The color MFP 37 is connected to a finisher apparatus.

[System Configuration of PostPress Section]

Figure 5:
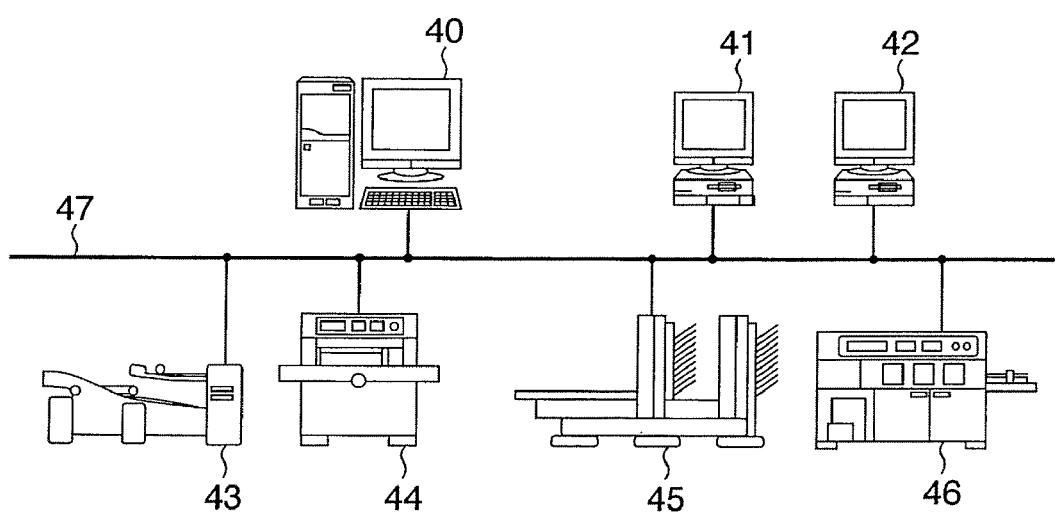
FIG. 5 is a view showing an example of the configuration of a PostPress section.

FIG. 5 is a view showing an example of the configuration of the PostPress section.

The PostPress section 6 comprises a PostPress server 40, client PCs 41 and 42, and post-processing apparatuses typified by a paper folding apparatus 43, cutting apparatus 44, saddle stitching apparatus 45, and case binding apparatus 46.

The PostPress server 40 is a computer which comprehensively manages post-processes, and creates post-process conditions finishable by the PostPress section 6 on the basis of a job instruction accepted by the order receiving server 21, a job instruction output from the MIS server 20, and the like. The PostPress server 40 designates a post-process (finishing process) requested by an end user. The PostPress server 40 generally uses an information exchange means such as the JDF job ticket with the outside of the PostPress section 6 to exchange information with post-processing apparatuses on the basis of the internal command and status of the PostPress section 6.

Post-processing apparatuses can be roughly classified into three categories and are defined as follows.

1) In-line finisher: a post-processing apparatus which has a paper path physically connected to an MFP and can electrically transmit/receive an operation instruction and status check to/from the MFP. In the following description, a finisher apparatus means an in-line finisher apparatus, unless otherwise specified.

2) Near-line finisher: a post-processing apparatus which has a paper path not physically connected to an MFP, requests an operator to carry and set an output material, and can electrically transmit/receive an operation instruction and status check via a communication means such as a network.

3) Off-line finisher: a post-processing apparatus which has neither a paper path nor an operation instruction/status check communication means connected to an MFP, and requests an operator to carry and set an output material, manually input an operation, and visually check a status report from the apparatus.

Post-processing apparatuses execute post-processes to perform various sheet processes for an output document printed by an image forming apparatus such as an MFP. The post-processes include a cutting process, saddle stitching process, case binding process, paper folding process, punching process, insertion process, and collation process. The post-processing apparatuses process sheets into a bookbinding form provided to an end user.

Near-line finishers (sometimes including off-line finishers) managed by the PostPress server 40 include the paper folding apparatus 43, cutting apparatus 44, saddle stitching apparatus 45, and case binding apparatus 46. In addition, there are various near-line finishers such as a stapler, puncher, inserter, and collator. The PostPress server 40 grasps the statuses of devices and jobs and manages the job execution status by, e.g., sequential polling based on a predetermined protocol with these near-line finishers.

The embodiment is applicable to a configuration in which respective sheet processing apparatus can execute the above-mentioned sheet processes, or a configuration in which one sheet processing apparatus can execute a plurality of types of sheet processes. The system may consist of one of the sheet processing apparatuses.

In the POD system, the PostPress section 6 does not always process all print jobs. The color MFP 37 having a finisher apparatus may execute post-processing.

A conventional commercial printing business has proposed a commercial printing workflow using a job ticket. A "job ticket-based workflow" and job ticket in a POD system used in the conventional commercial printing business will be exemplified with reference to FIGS. 6 to 8.

FIG. 6 is a view showing an example of a workflow implemented by a job ticket.

In FIG. 6, the MIS server 20 is a system which manages the workflow of the whole system from reception of an order to delivery, and comprehensively manages various kinds of management information and sales information. The MIS server 20 incorporates a JDF (Job Definition Format) creation application 51 for creating JDF data 52 corresponding to a job ticket which describes a work instruction in the workflow.

The print server 30 receives a job input to the digital printing section 5, and manages and controls the overall digital printing section 5. The print server 30 comprises a JDF parser 53 for interpreting the JDF data 52, and a PDL controller 54 for processing various PDL data such as PDF/PS. The print server 30 also comprises a printer/finisher interface 55 for connecting a finisher apparatus 58 (finisher A) to a printer engine such as an MFP.

The job ticket-based workflow is implemented as follows.

When a received order job 50 is input to the MIS server 20, the operator uses the JDF creation application 51 installed in the MIS server 20 to create JDF data 52 equivalent to a job ticket which describes a work instruction in the workflow.

When the print server 30 receives the created JDF data 52, the JDF parser 53 of the print server 30 interprets the JDF data 52, and executes a job to the digital printing section 5. For example, the JDF data 52 designates attributes such as the output paper size, single/double-sided printing, and N-up. In accordance with the contents of the JDF data 52, the PDL controller 54 processes PDL data such as PDF/PS to be referred to by the JDE data 52. The PDL controller 54 causes the MFP 56 via the printer/finisher interface 55 to print.

By executing printing, an output document 57 is conveyed to the finisher apparatus 58.

If the JDF data 52 designates an attribute such as case binding, saddle stitching, or cutting, the print server 30 causes the finisher apparatus 58 via the printer/finisher interface 55 to execute a post-process in accordance with the contents of the JDF data 52.

Figure 7:
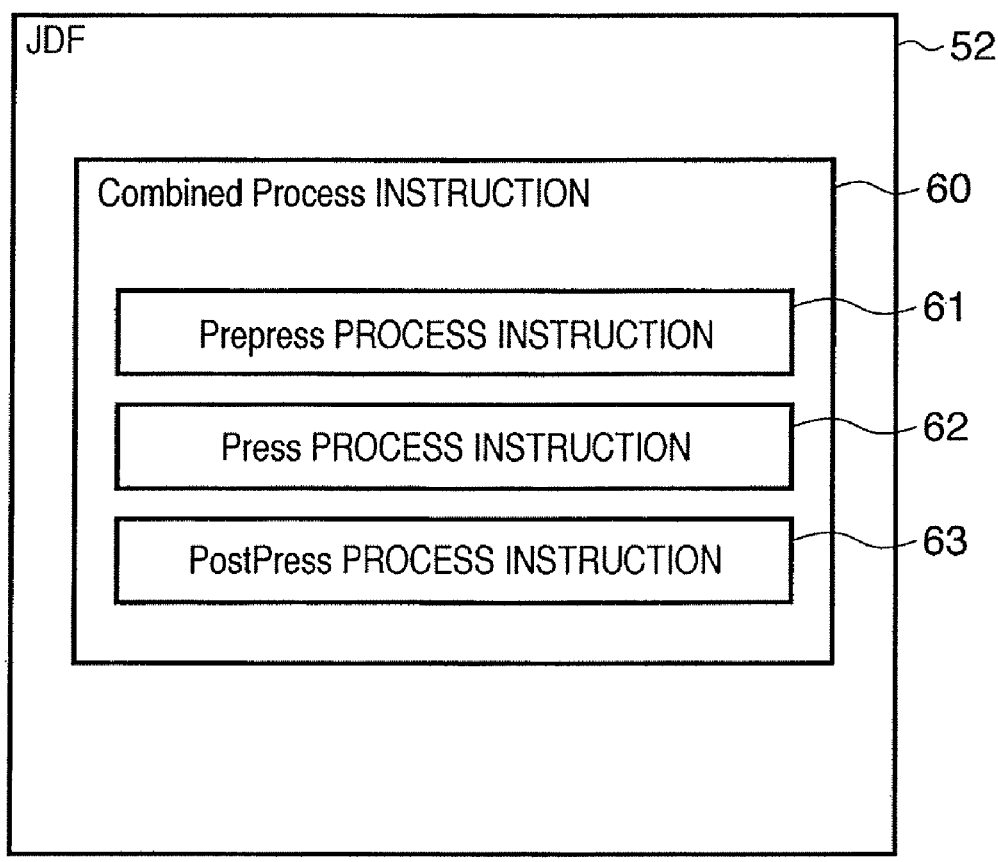
FIG. 7 is a view showing an example of the structure of the job ticket in a POD system.

FIG. 7 is a view showing an example of the structure of the job ticket in the POD system.

Reference numeral 52 denotes entire JDF data. A Prepress process instruction 61 describes Prepress process instructions representing, e.g., the image process and layout of contents data such as PDF. A Press process instruction 62 describes Press process instructions representing, e.g., how to output image data created in the Prepress process to a document. A PostPress process instruction 63 describes PostPress process instructions representing a post-process (e.g., case binding) for a document output in accordance with the Press process instruction 62.

Reference numeral 60 denotes a Combined Process instruction to combine the Prepress process instruction 61, Press process instruction 62, and PostPress process instruction 63 into one process. An output from the color MFP 37 or the like which manages digital printing is generally a bookbinding result after executing the Prepress, Press, and PostPress processes in response to input of one print job.

The Combined Process instruction 60 is used to simultaneously execute the Prepress process+Press process+PostPress process and provide only one output in response to one data input. The Combined Process instruction 60 is always used as an instruction to a digital image forming apparatus such as the MFP which supports at least two of the Prepress, Press, and PostPress processes.

Figure 8:
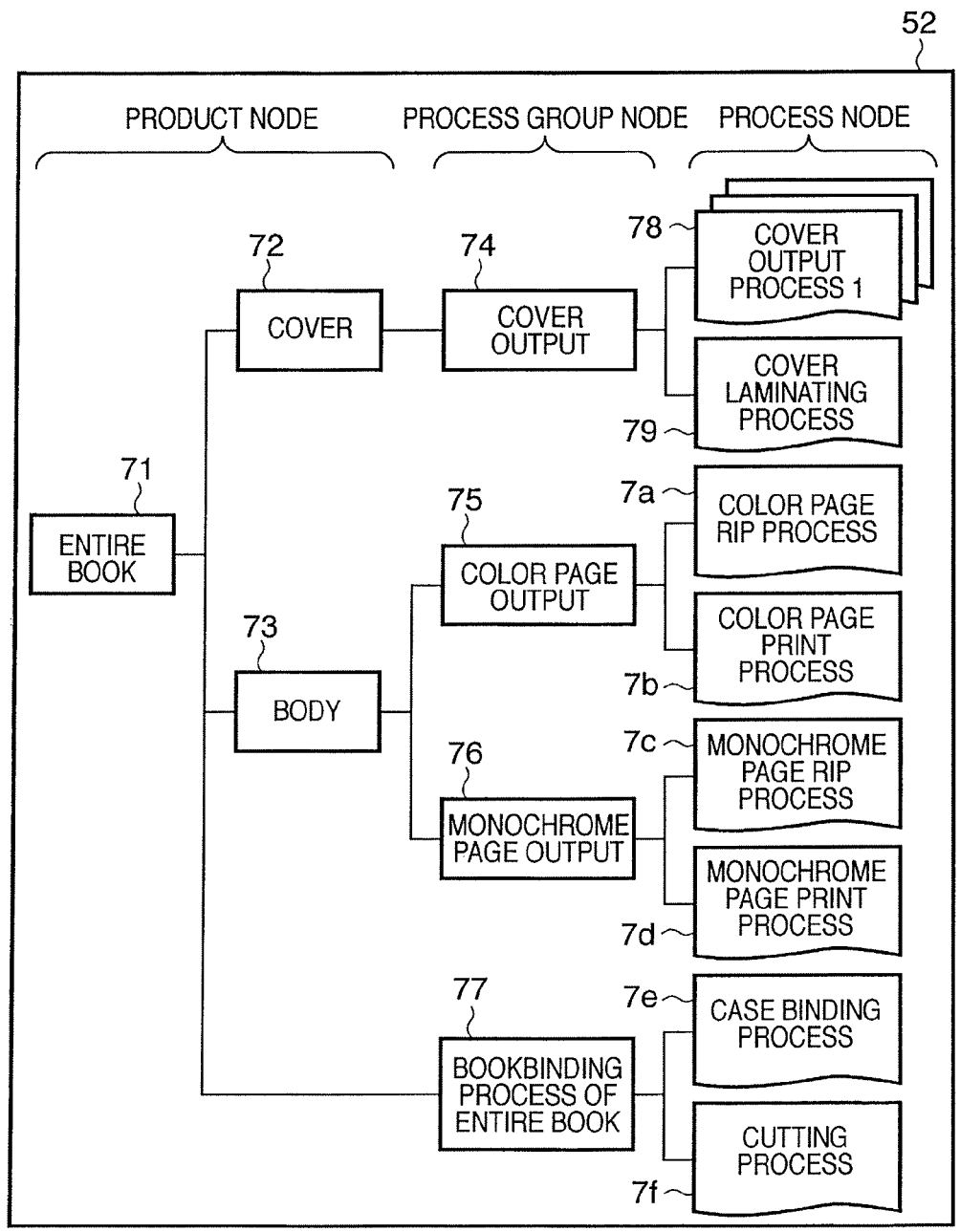
FIG. 8 is a view showing another example of the structure of the job ticket in the POD system.

FIG. 8 is a view showing another example of the structure of the job ticket in the POD system.

The JDF which expresses a job ticket is described in the XML format, and is expressible by the hierarchical structure of nodes. FIG. 8 is a hierarchical view showing an example of JDF-based bookbinding. On the other hand, FIG. 7 shows the JDF structure by the types of execution processes.

"Entire book" 71 to be delivered to an end user is created through various processes to prepare a cover 72, prepare a body 73, and bind them.

In the JDF, a process to create a physical output material in forming an output material is called a product node, and a process to create a product node is called a process node. In addition, a group of process nodes serving as elements on the intermediate stage for creating a product node is called a process group node (cover output 74, color page output 75, monochrome page output 76, and bookbinding process 77 of the entire book).

The Prepress process in FIG. 7 corresponds to a color page RIP process 7a and monochrome page RIP process 7c. The Press process corresponds to a cover output process 1 78, cover laminating process 79, color page print process 7b, and monochrome page print process 7d. The PostPress process corresponds to a case binding process 7e and cutting process 7f.

An example of gang job printing in a conventional POD system will be explained with reference to FIGS. 9 to 15. The gang job means a job to execute a plurality of jobs as a single job (i.e. a job consisting of a plurality of jobs ganged together).

Figure 9:
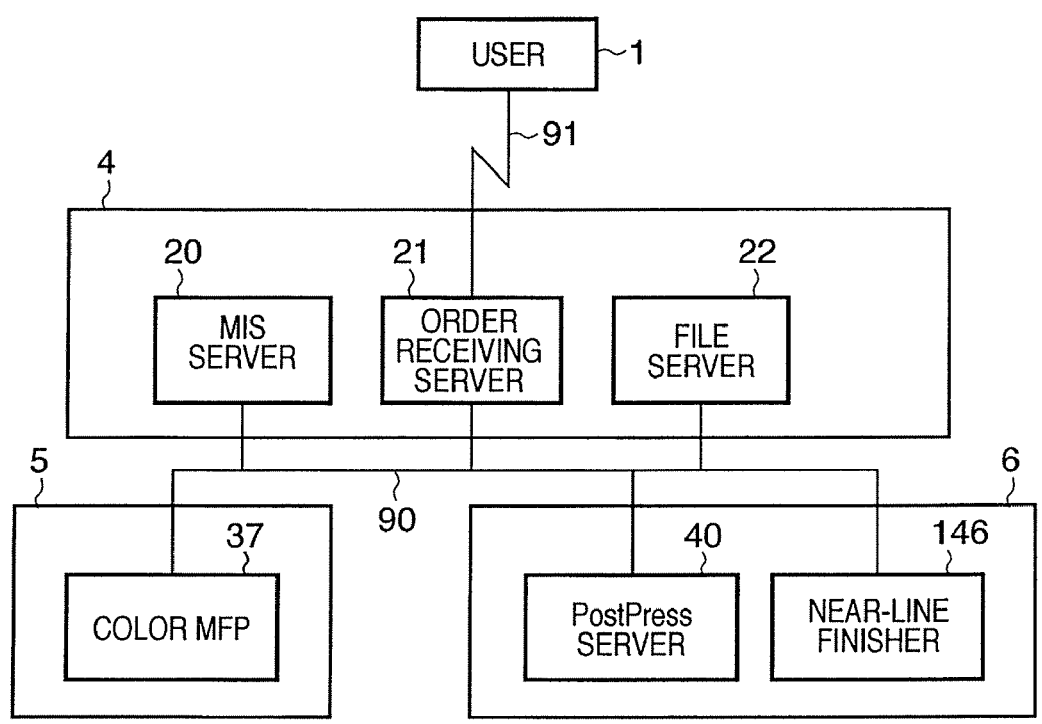
FIG. 9 is a block diagram showing another example of the configuration of the POD system.

FIG. 9 is a block diagram showing another example of the configuration of the POD system in FIG. 1.

In FIG. 9, the process management section 4 is formed from the MIS server 20, order receiving server 21, and file server 22. The digital printing section 5 is formed from the color MFP 37. The PostPress section 6 is formed from the PostPress server 40 and a near-line finisher 146. The POD system in FIG. 9 does not have the Prepress section 7. Reference numeral 90 denotes a network such as a LAN; and 91, a communication channel such as the Internet.

In the following example, the cards of users A, B, and C are printed by a gang job.

Figure 10:
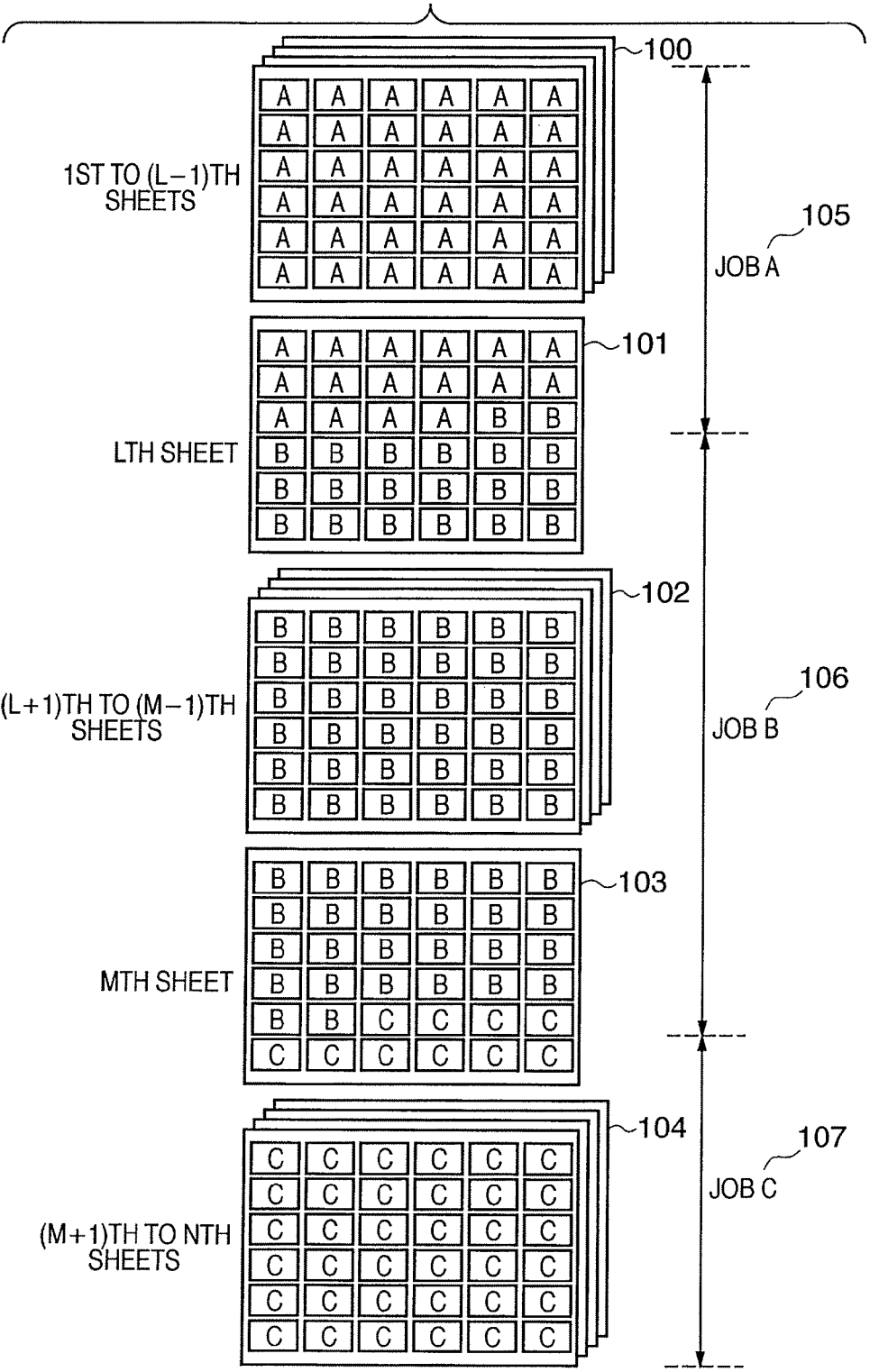
FIG. 10 is a view showing an example of an output document based on a gang job.

FIG. 10 shows an example of an output from the color MFP 37 for a gang job.

Reference numerals 100 to 104 denote output documents from the color MFP 37. The output document 100 is formed from document sheets on which the card of user A is printed. The output document 101 contains the cards of both users A and B. The output document 102 is formed from document sheets on which the card of user B is printed. The output document 103 contains the cards of both users B and C. The output document 104 is formed from document sheets on which the card of only user C is printed.

This example shows a gang job of three merged jobs of the same type for different users.

Reference numeral 105 denotes an area where the card of user A is printed on the output document. Reference numeral 106 denotes an area where the card of user B is printed on the output document. Reference numeral 107 denotes an area where the card of user C is printed on the output document.

Figure 11:
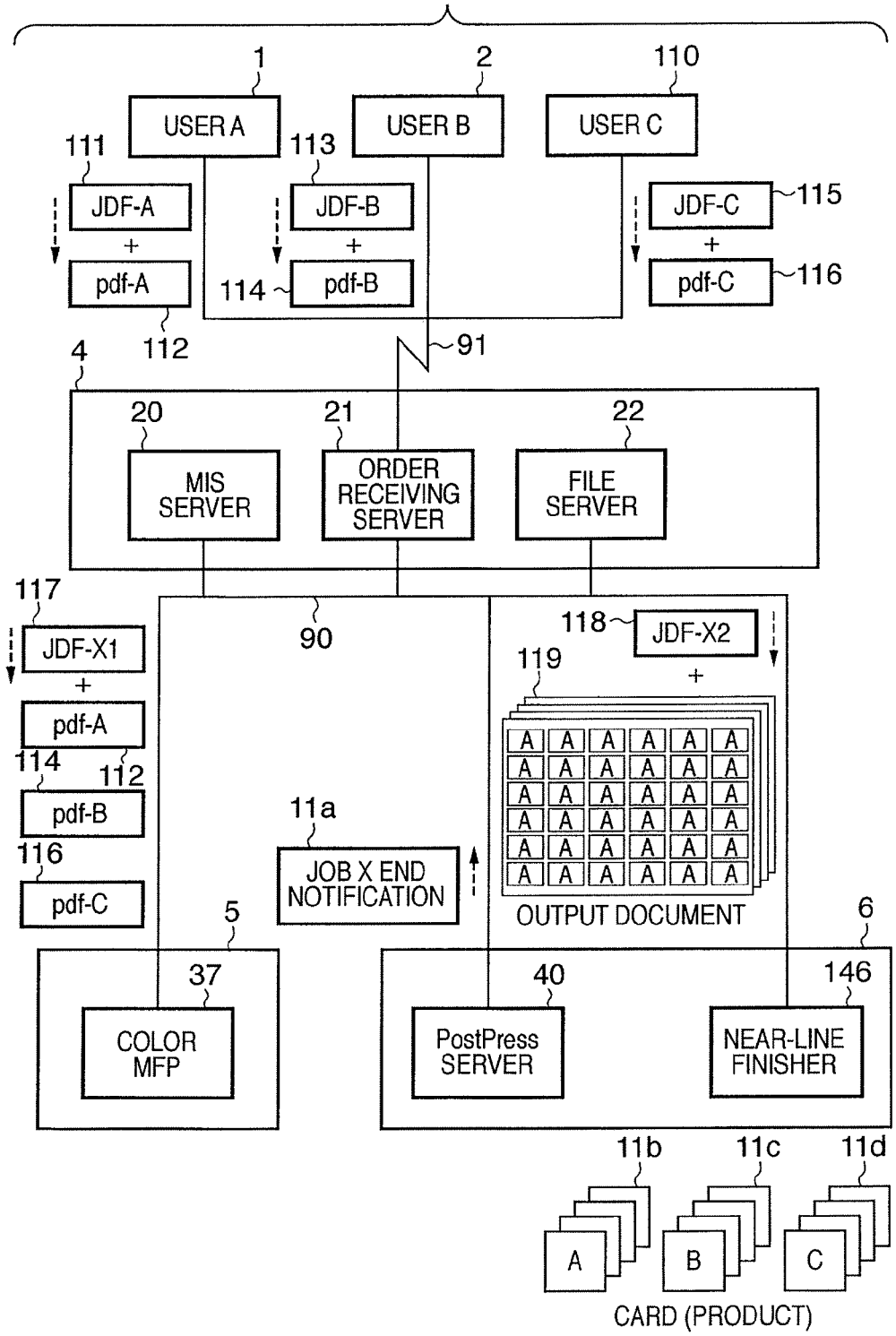
FIG. 11 is a view for explaining the process sequence of the gang job.

FIG. 11 is a view for explaining how to process the gang job shown in FIG. 10 by the POD system in FIG. 9.

In this example, jobs from three users A, B, and C are processed, so the end user environment 2 (user B) and an end user environment 110 (user C) are added to the configuration of FIG. 9.

Reference numeral 111 denotes a JDF-A which is a JDF transmitted from user A to the POD system, and describes a work instruction to create the card of user A. Reference numeral 112 denotes contents data (pdf-A) which is transmitted from user A and records image data expressing the card of user A. The JDF-A 111 and contents data (pdf-A) 112 form a print job for user A. In this example, contents data is PDF data.

Similarly, reference numeral 113 denotes a JDF-B which is a JDF transmitted from user B to the POD system, and describes a work instruction to create the card of user B. Reference numeral 114 denotes contents data which is transmitted from user B and records image data expressing the card of user B. The JDF-B 113 and contents data (pdf-B) 114 form a print job for user B.

Reference numeral 115 denotes a JDF-C which is a JOE transmitted from user C to the POD system, and describes a work instruction to create the card of user C. Reference numeral 116 denotes contents data which is transmitted from user C and records image data expressing the card of user C. The JDF-C 115 and contents data (pdf-C) 116 form a print job for user C.

These three print jobs are first transmitted to the order receiving server 21. Then, JDF data are transmitted from the order receiving server 21 to the MIS server 20, whereas contents data are transmitted to the file server 22 and saved.

The MIS server 20 merges the three transmitted print jobs into one gang job. The JDF for the gang job is a JDF-X1 117. The MIS server 20 transmits the JDF-X1 117 and the contents data (pdf-A 112, pdf-B 114, and pdf-C 116) saved in the file server 22 to the color MFP 37 of the digital printing section 5.

The color MFP 37 performs a document print process in accordance with the instruction of the received JDF-X1 117. After the end of outputting all printed document sheets, the color MFP 37 transmits, to the PostPress server 40 of the PostPress section 6, a JDF-X2 118 which records the end of the printed document output process. The operator carries an output document 119 from the color MFP 37 to the near-line finisher 146, and sets it in the near-line finisher 146.

After the operator sets the document and designates the start of the cutting process, the PostPress server 40 in the PostPress section 6 transmits the cutting process instruction to the near-line finisher 146 in accordance with the instruction of the received JDF-X2 118, executing the cutting process. Final products obtained after the cutting process are a card 11b for user A, card 11c for user B, and card 11d for user C.

After the cutting process ends to create the cards of all the users, the PostPress server 40 transmits a gang job end notification 11a to the MIS server 20, ending the gang job process.

Figure 12:
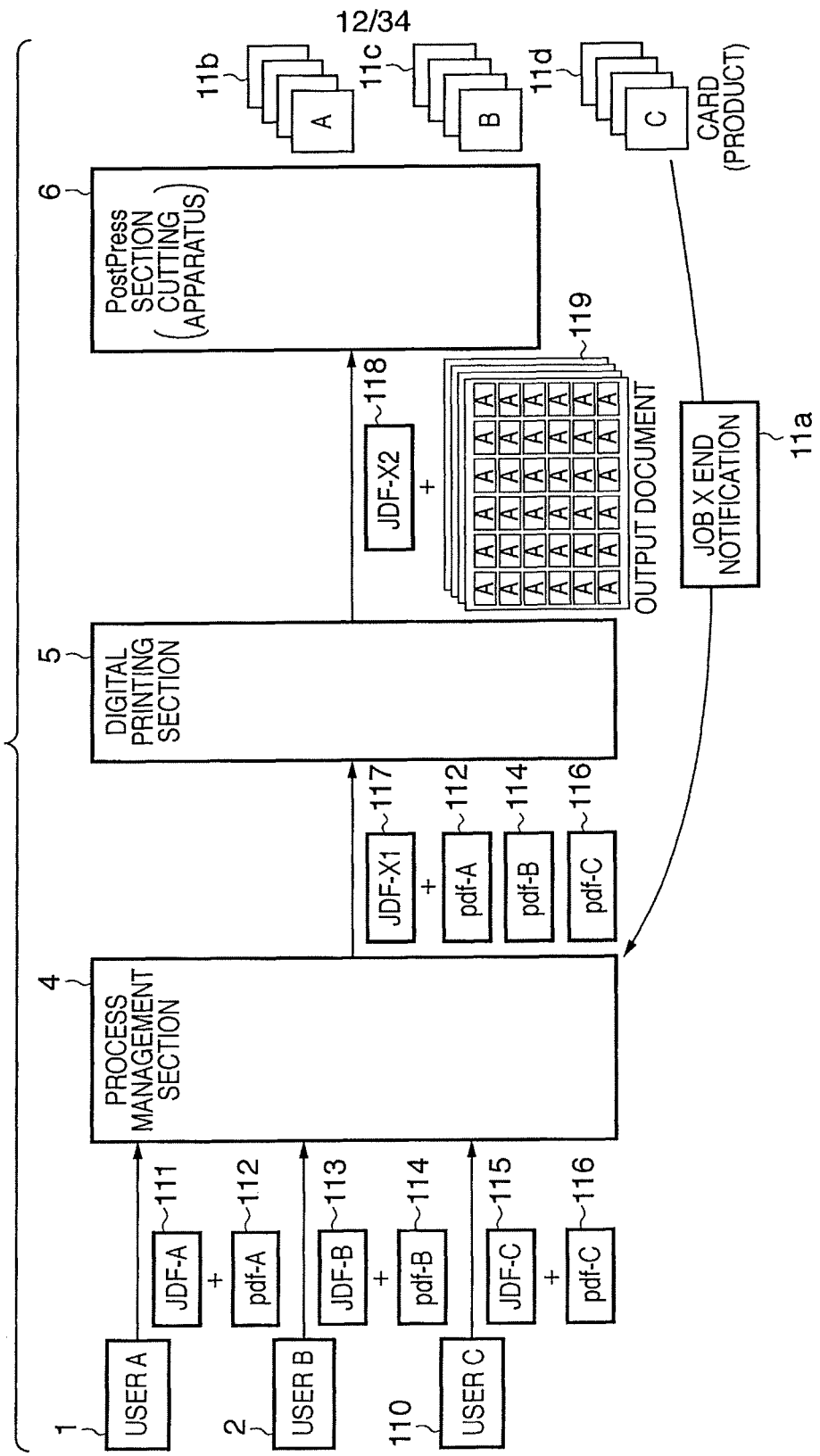
FIG. 12 is a view for explaining the process sequence of the gang job.

FIG. 12 shows a simple example of the process in FIG. 11.

In FIG. 12, the job process advances from the left to right, and the job end notification proceeds from the right to left. The MIS server 20, order receiving server 21, and file server 22 are not illustrated, but are arranged in the process management section 4 similarly to FIG. 11.

The color MFP 37 is also similarly arranged in the digital printing section 5, and the PostPress server 40 and near-line finisher 146 are also arranged in the PostPress section 6. The following description is based on the POD system configuration view of FIG. 12 to explain the data flow.

Figure 13:
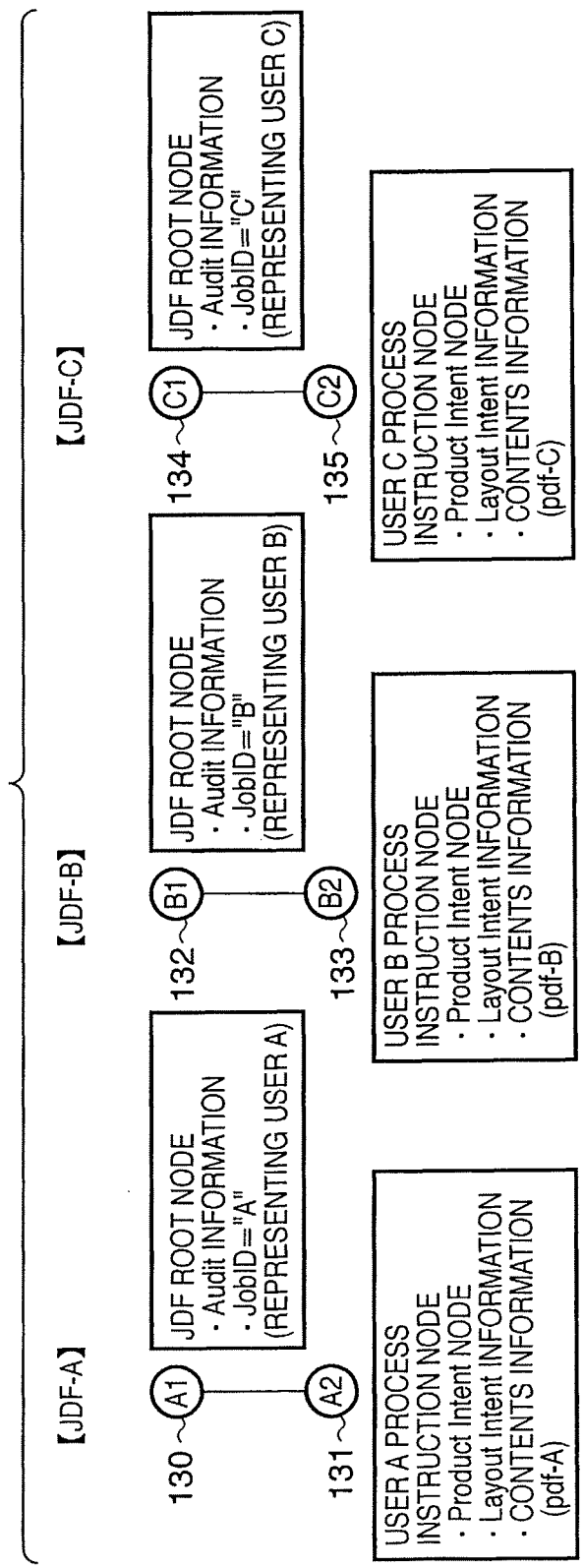
FIG. 13 is a view for explaining a JDF structure.

FIG. 13 shows JDFs transmitted from users A, B, and C to the POD system. FIG. 13 is a view for explaining the detailed structures of the JDF-A 111, JDF-B 113, and JDF-C 115. The JDF is described in the XML format, and each circle represents an XML node.

The JDF-A 111 has two nodes 130 and 131. The node 130 is a JDF root node which records Audit information such as the job creator and date, and Job ID information ("A") representing user A. The node 131 is a process instruction node for user A which records Layout Intent information representing the layout in printing as Product Intent information, and contents information ("pdf-A") representing the pdf name and location used for this job.

Similarly, the JDF-B 113 has two nodes 132 and 133. The node 132 is a JDF root node which records Audit information such as the job creator and date, and Job ID information ("B") representing user B. The node 133 is a process instruction node for user B which records Layout Intent information representing the layout in printing as Product Intent information, and contents information ("pdf-B") representing the pdf name and location used for this job.

The JDF-B 115 has two nodes 134 and 135. The node 134 is a JDF root node which records Audit information such as the job creator and date, and Job ID information ("C") representing user C. The node 135 is a process instruction node for user C which records Layout Intent information representing the layout in printing as Product Intent information, and contents information ("pdf-C") representing the pdf name and location used for this job.

Figure 14:
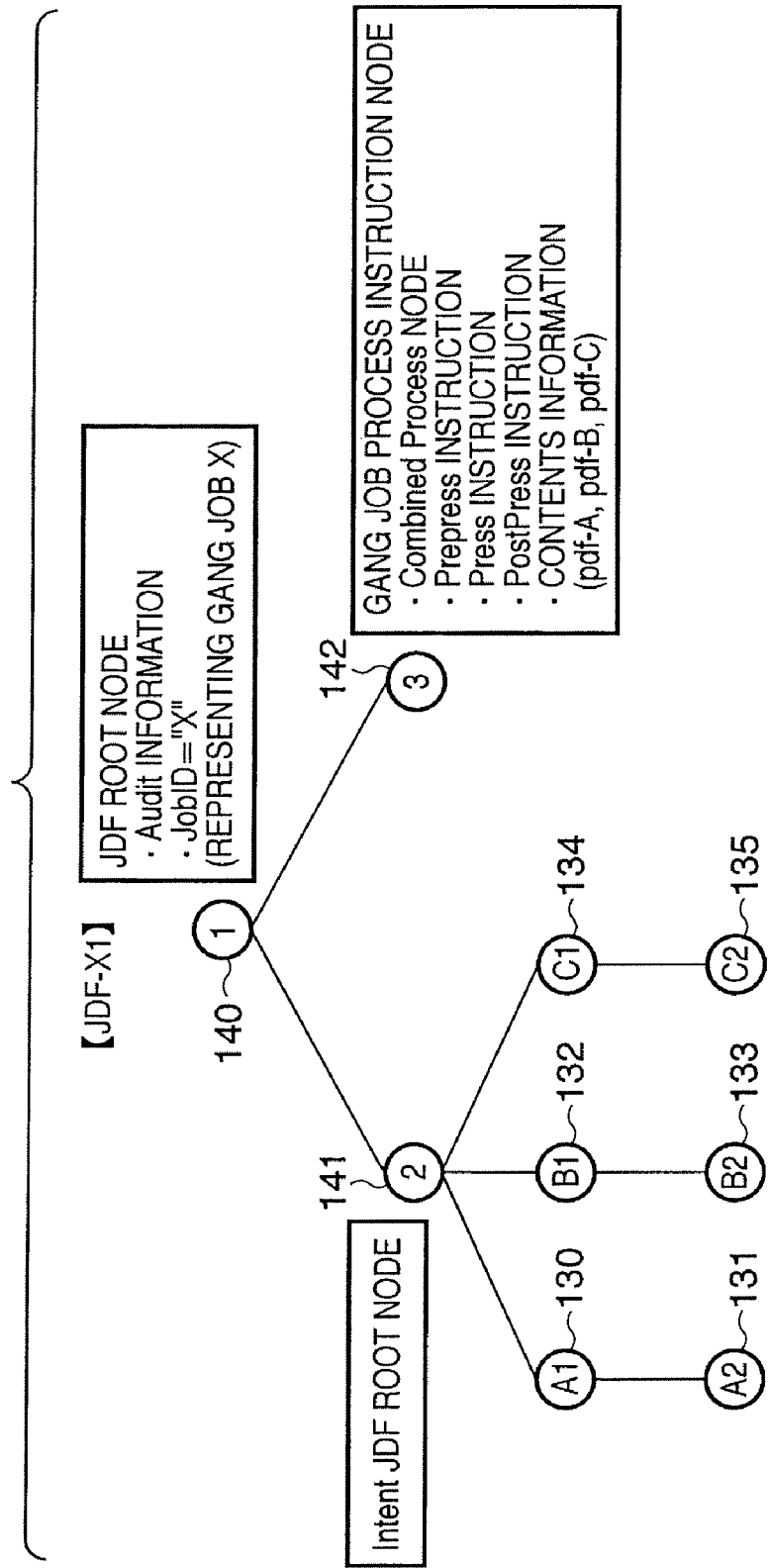
FIG. 14 is a view for explaining another JDF structure.

FIG. 14 is a view for explaining the structure of the JDF-X1 117 which is a JDF transmitted from the MIS server 20 to the color MFP 37.

The MIS server 20 generates the JDF-X1 117 as a gang job by merging the JDF-A 111, JDF-B 113, and JDF-C 115.

As shown in FIG. 14, the JDF-X1 117 has nine nodes. A node 140 is a JDF root node which records Audit information and Job ID information ("X") representing gang job X. A node 141 is an Intent information root node below which information of JDF-A, JDF-B, and JDF-C serving as the original jobs of the gang job are directly recorded.

A node 142 is a gang job process instruction node which is a Combined Process node describing an instruction to execute a plurality of processes at once. The node 142 describes a Prepress instruction, Press instruction, and PostPress instruction. The node 142 also describes contents information (pdf-A, pdf-B, and pdf-C) representing pdf file names and locations for use.

Figure 15:
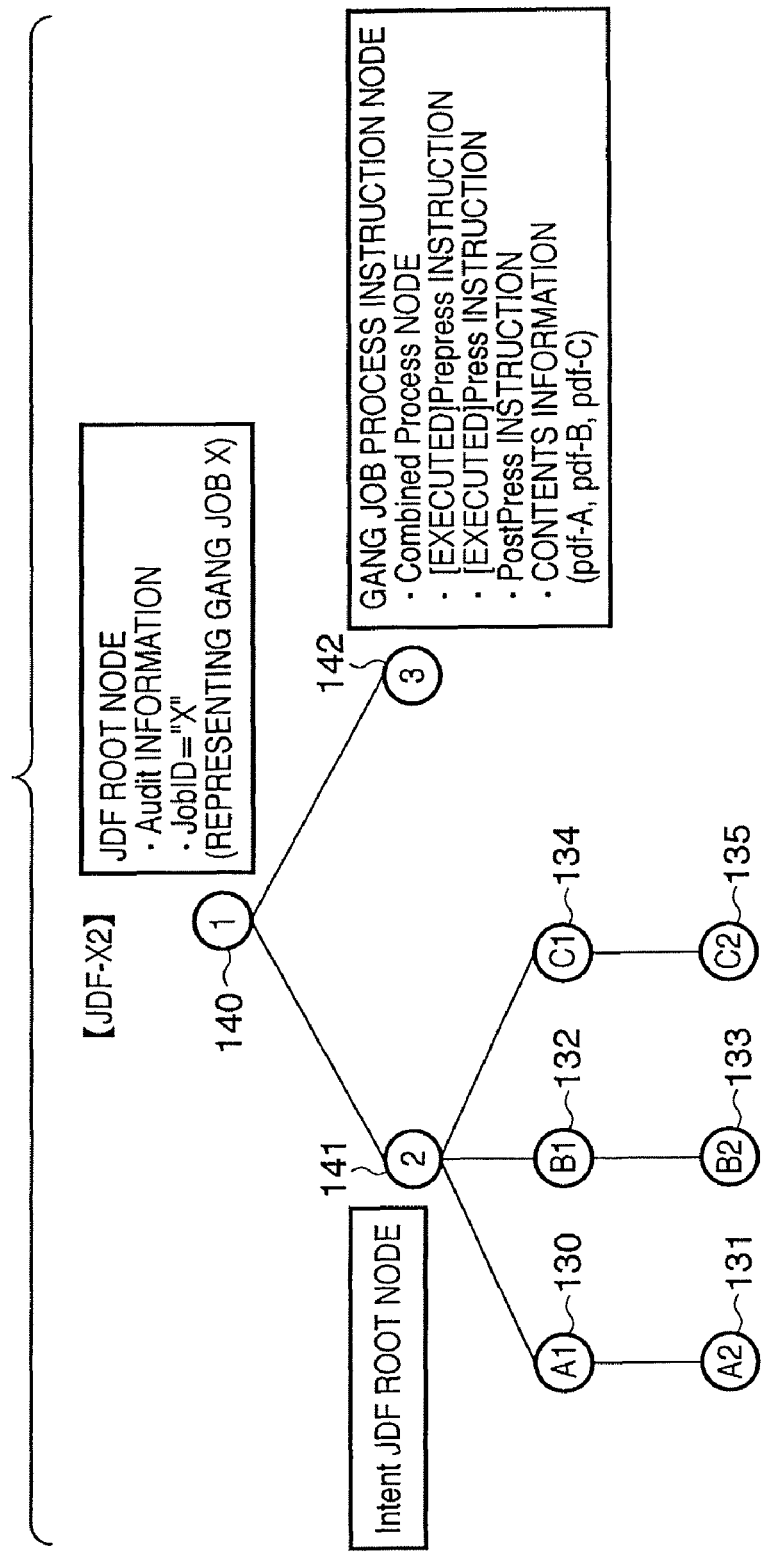
FIG. 15 is a view for explaining the JDF structure of the gang job.

FIG. 15 is a view for explaining the structure of the JDF-X2 118 which is a JDF transmitted from the color MFP 37 to the PostPress server 40.

The structure and instruction contents of the JDF-X2 118 are basically the same as those of the JDF-X1 117. However, the JDF-X2 118 describes a mark "executed" in an instruction whose process ended by the color MFP 37. In this example, the mark "executed" is described in a Prepress instruction and Press instruction below the node 142 serving as a gang job process instruction node. No mark is described in a PostPress instruction because its process is not executed. In the subsequent process, processes with the mark "executed" are not executed.

After all the processes of the gang job end, users A, B, and C each receive an end notification.

The basic process sequence of the gang job in the POD system has been described.

The conventional gang job process sequence may decrease the process efficiency because even if some processes of jobs of a gang job are complete, no end notification is sent to the job generating side unless all the processes of the gang job end.

To solve this, the present invention will describe a configuration of, when a job process ends for a given user, sending an end notification (job status information) to the user by determining the relationship of contents of a gang job and an original job.

Further, the present invention will describe a configuration of, when a job process ends for a given user, transferring only the job to the next process to give the user his product before the end of all gang job processes.

<First Embodiment>

The first embodiment of the present invention will be described with reference to FIGS. 9, 10, 12 to 14, and 16 to 22.

FIG. 9, which has been used in an example of the basic configuration, is a block diagram showing an example of the configuration of a POD system according to the present invention. FIG. 10, which has been used in an example of the basic configuration, is a view showing an example of an output from a color MFP 37 by a gang job according to the present invention.

FIG. 12, which has been used in an example of the basic configuration, is a block diagram showing the same configuration of the present invention as the configuration of the POD system in the block diagram of FIG. 9. The data flow of JDF-A, pdf-A, JDF-X1, and the like in FIG. 12 is related to the basic configuration, and will be explained again in the first embodiment.

FIG. 13, which has been used in an example of the basic configuration, is a view for explaining JDFs transmitted from users A, B, and C to the POD system according to the present invention. FIG. 14, which has been used in an example of the basic configuration, is a view for explaining the structure of JDF-X1 which is a JDF transmitted from a MIS server 20 to the color MFP 37.

Figure 16:
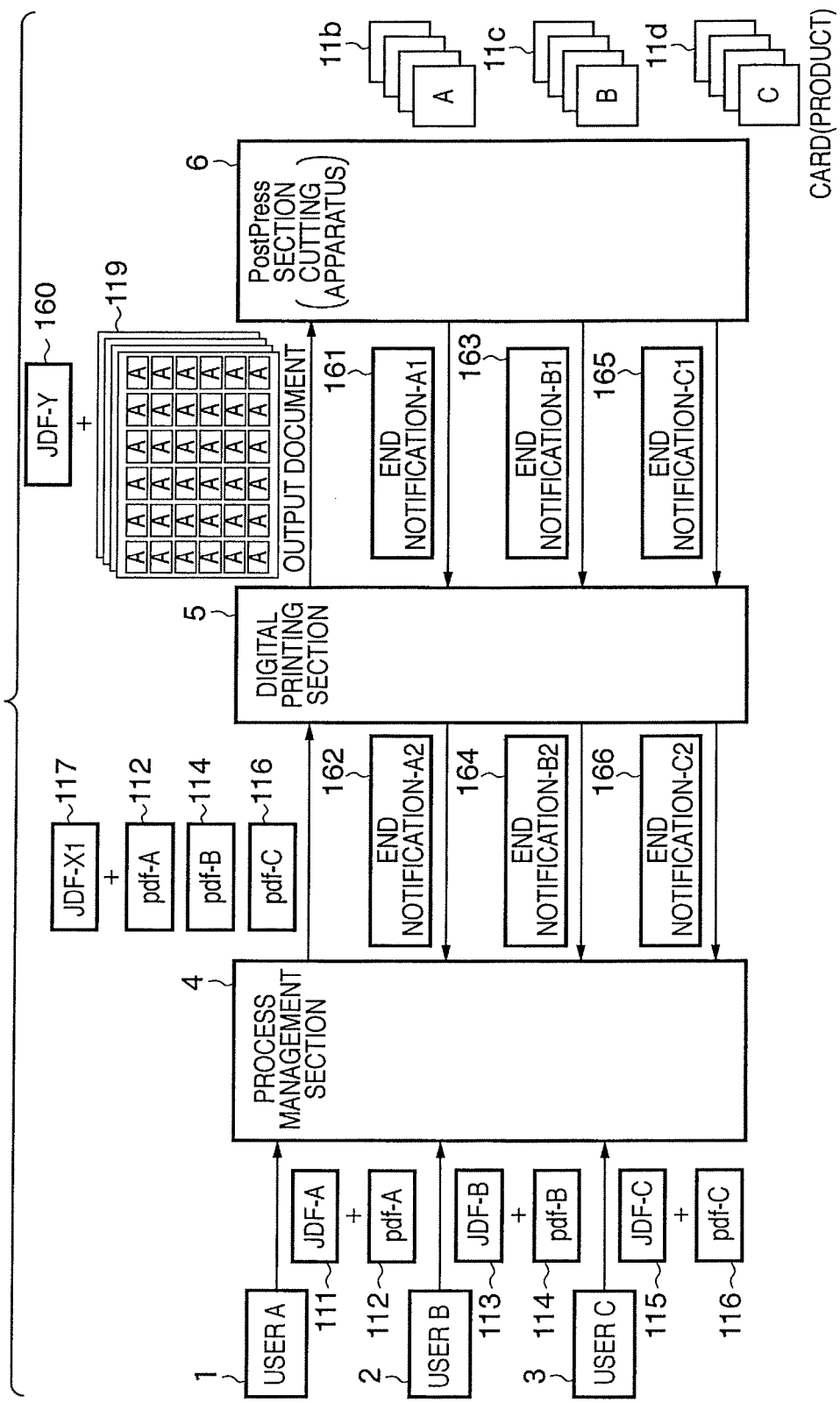
FIG. 16 is a view for explaining a job process sequence according to the first embodiment of the present invention.

FIG. 16 is a view for explaining a job process sequence according to the first embodiment of the present invention.

A JDF-A 111, JDF-B 113, JDF-C 115, JDF-X1 117, pdf-A 112, pdf-B 114, and pdf-C 116 are identical to those described in the conventional technique. The JDF-X1 117 is a gang job generated by the MIS server 20. A JDF-Y 160 is created by the color MFP 37 in a digital printing section 5. The JDF-Y 160 describes work procedures to send an end notification to the color MFP 37 when the PostPress process ends for the user of each job in a gang job. A method of generating the JDF-Y 160 will be described later.

Reference numeral 119 denotes an output material of a gang job from the color MFP 37. The output material 119 is identical to that described in the conventional technique. Reference numerals 11b, 11c, and 11d denote cards identical to those described in the conventional technique. Also in the first embodiment, reference numeral 11b denotes a card as a user A product; 11c, a card as a user B product; and 11d, a card as a user C product.

Reference numeral 161 denotes an end notification-A1 transmitted from a PostPress server 40 of a PostPress section 6 to the color MFP 37 at the end of creating the card 11b serving as a user A product. This notification is sent in accordance with the instruction of the JDF-Y 160.

Similarly, reference numeral 163 denotes an end notification-B1 transmitted from the PostPress server 40 of the PostPress section 6 to the color MFP 37 at the end of creating the card 11c serving as a user B product. Reference numeral 165 denotes an end notification-C1 transmitted from the PostPress server 40 of the PostPress section 6 to the color MFP 37 at the end of creating the card 11d serving as a user C product.

An end notification-A2 162 is a user A job process end notification sent from the color MFP 37 to the MIS server 20 of a process management section 4 upon reception of the end notification-A1 161. Similarly, an end notification-B2 164 is a user B job process end notification sent from the color MFP 37 to the MIS server 20 of the process management section 4 upon reception of the end notification-B1 163. An end notification-C2 166 is a user C job process end notification sent from the color MFP 37 to the MIS server 20 of the process management section 4 upon reception of the end notification-C1 165.

Figure 17:
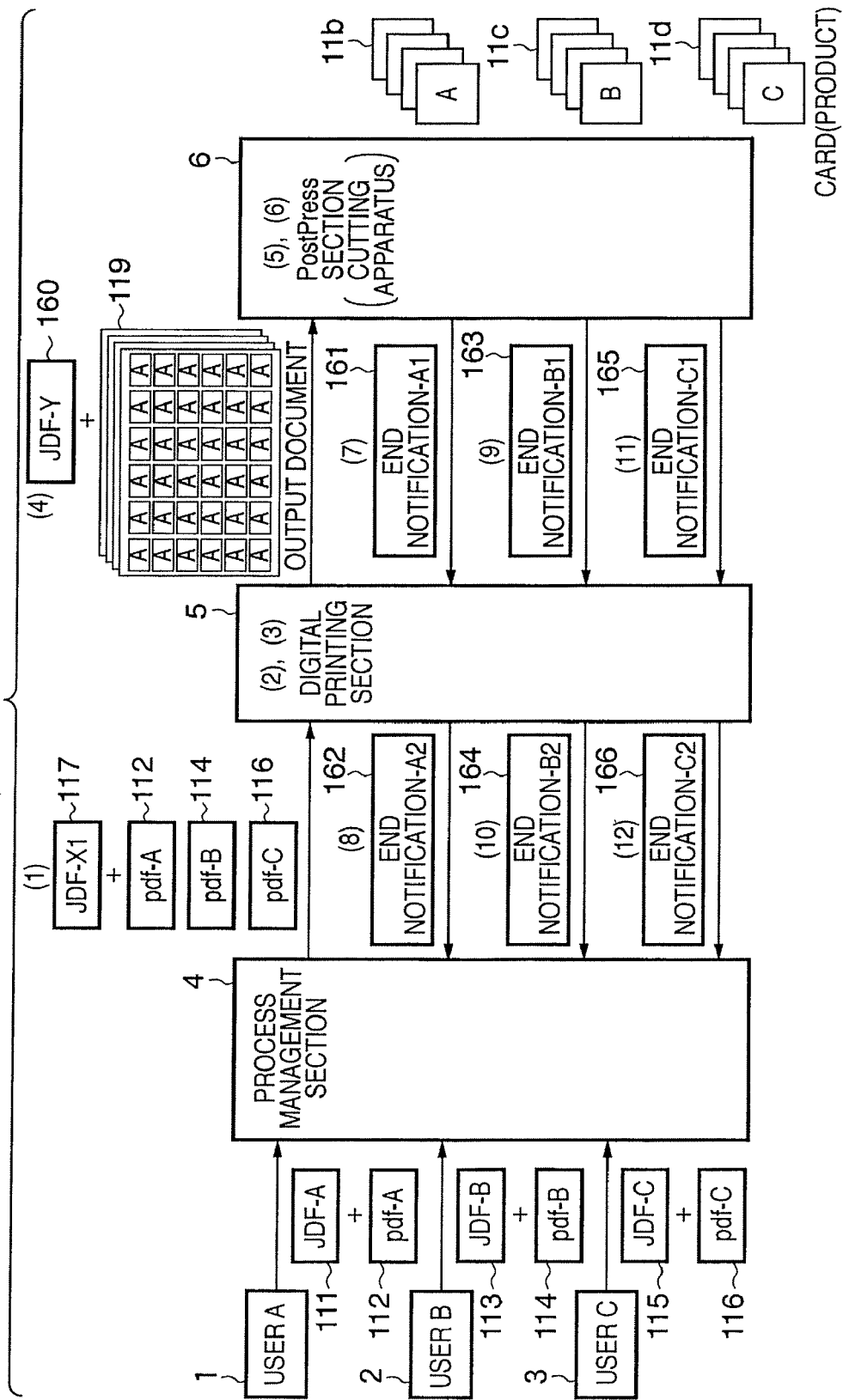
FIG. 17 is a view for explaining the job process sequence according to the first embodiment of the present invention.

FIG. 17 is a view for explaining the process order of the data flow in FIG. 16. In FIG. 17, (1) to (12) represent the process order, and the process proceeds in ascending numerical order.

(1) represents reception of a job. The digital printing section 5 receives, from the MIS server 20, a gang job (JDF-X1 117) of merged jobs of users A, B, and C.

(2) represents creation of the JDF-Y 160. The digital printing section 5 creates the JDF-Y 160 from the gang job (JDF-X1 117). The JDF-Y 160 describes an instruction to perform a cutting process for user A and return the end of the cutting process to the device, an instruction to perform a cutting process for user B and return the end of the cutting process to the device, and an instruction to perform a cutting process for user C and return the end of the cutting process to the device. The structure and creation method of the JDF-Y 160 will be described later.

(3) represents output of a document. The digital printing section 5 executes the Prepress and Press processes of the gang job (JDF-X1 117).

(4) represents transmission of the gang job to a near-line finisher. The gang job (JDF-Y 160) is transmitted to the near-line finisher.

(5) represents setting of an output document in the near-line finisher. The operator sets a document output from the device in the near-line finisher.

(6) represents execution of the cutting process. The operator executes the cutting process with the near-line finisher.

(7) represents transmission of an end notification. At the end of the cutting process for user A, the PostPress section 6 transmits a user A job end notification to the digital printing section 5 in accordance with the instruction of the JDF-Y 160.

(8) represents transmission of an end notification. The digital printing section 5 transmits a user A job end notification to the MIS server 20 of the process management section 4.

(9) represents transmission of an end notification. At the end of the cutting process for user B, the PostPress section 6 transmits a user B job end notification to the digital printing section 5 in accordance with the instruction of the JDF-Y 160.

(10) represents transmission of an end notification. The digital printing section 5 transmits a user B job end notification to the MIS server 20 of the process management section 4.

(11) represents transmission of an end notification. At the end of the cutting process for user C, the PostPress section 6 transmits a user C job end notification to the digital printing section 5 in accordance with the instruction of the JDF-Y 160.

(12) represents transmission of an end notification. The digital printing section 5 transmits a user C job end notification to the MIS server 20 of the process management section 4.

Figure 18:
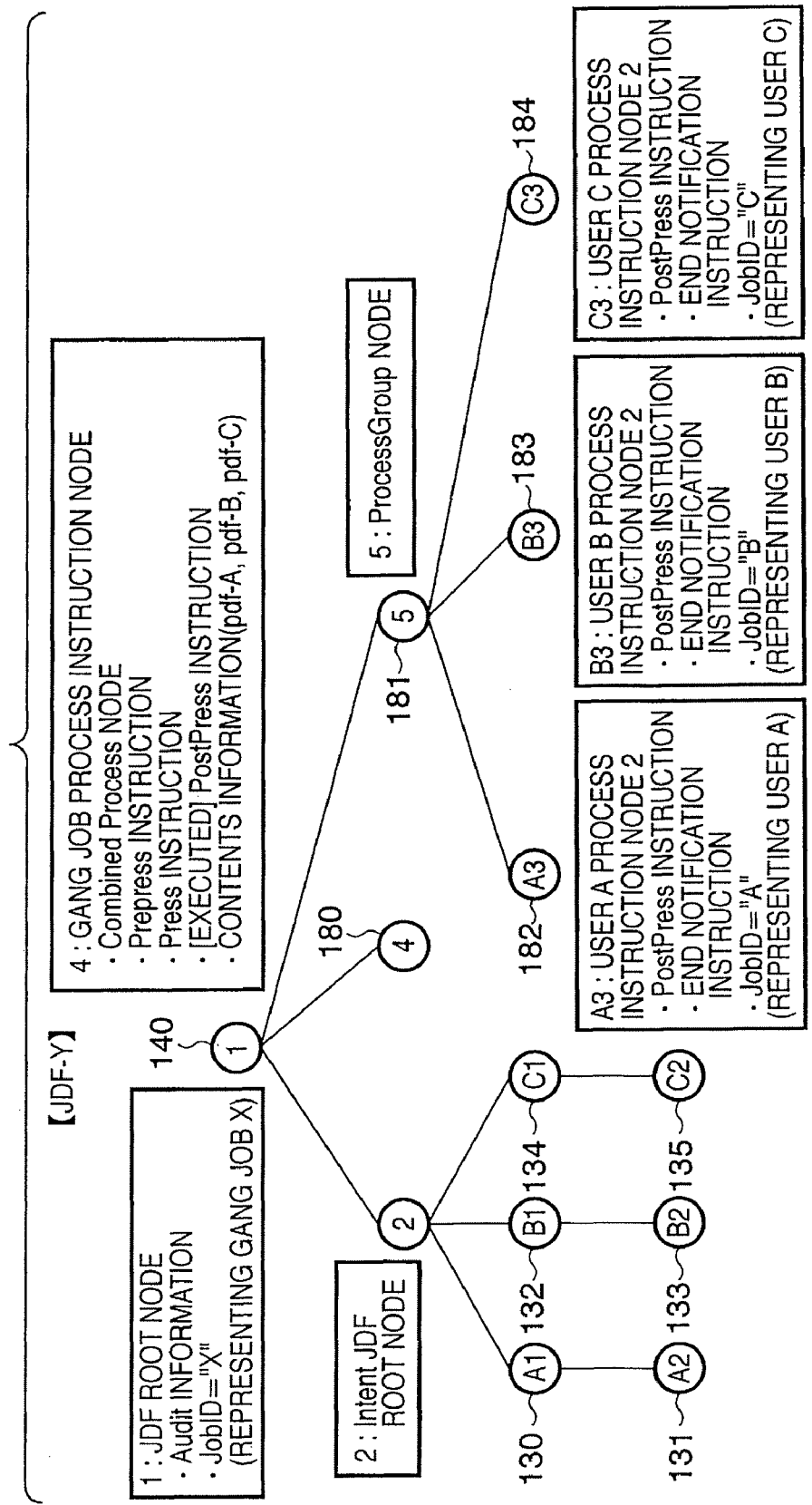
FIG. 18 is a view for explaining a JDF structure according to the first embodiment of the present invention.

FIG. 18 is a view for explaining the structure of the JDF-Y 160.

The color MFP 37 generates the JDF-Y 160 on the basis of the JDF-X1 117.

Nodes 130 to 135 and 140 are identical to those in FIG. 14. Reference numeral 180 denotes a gang job process instruction node similar to the node 142 in FIG. 14. The node 180 describes a Prepress instruction, Press instruction, PostPress instruction, and contents information representing pdf-A, pdf-B, and pdf-C. The PostPress instruction is marked with "executed" representing that no PostPress process need be performed (the process has been executed). The node 180 is a direct copy of the node 142 except that a process nonnecessity mark is added to only the PostPress instruction representing whether to execute the PostPress process.

The color MFP 37 newly creates subsequent nodes 181 to 184.

The node 181 is a ProcessGroup node which groups the nodes 182 to 184.

The node 182 is a user A process instruction node, and describes a PostPress instruction, end notification instruction, and Job ID ("A") representing user A. The node 182 records a PostPress instruction serving as a cutting instruction to create only the card of user A, and an end notification instruction to send an end notification to the color MFP 37 at the end of the PostPress process. The node 182 further records Job ID representing the type of job added to an end notification. The PostPress section 6 performs the cutting process and end notification process in accordance with these instructions. A method of creating the PostPress instruction will be described later.

Similarly, the node 183 is a user B process instruction node, and describes a PostPress instruction, end notification instruction, and Job ID ("B") representing user B. The node 184 is a user C process instruction node, and describes a PostPress instruction, end notification instruction, and Job ID ("C") representing user C.

The JDF-X1 117 and JDF-Y 160 have a difference: The JDF-Y 160 changes the PostPress instruction described in the JDF-X1 117 to "executed", newly creates the node 181 (5) serving as a ProcessGroup node, and creates the following three nodes 182 to 184 below the node 181.

The first node is the node 182 (A3) containing a PostPress (cutting process) instruction and end notification instruction for user A. The second node is the node 183 (B3) containing a PostPress (cutting process) instruction and end notification instruction for user B. The third node is the node 184 (C3) containing a PostPress (cutting process) instruction and end notification instruction for user C. The remaining structure is the same as that of the JDF-X1 117.

The destination of the end notification instruction is given by address information such as a mail address or the IP address of the apparatus. The notification is sent by mail or a message dialog.

A method of creating a cutting process instruction (PostPress instruction) for each user by the color MFP 37 will be explained with reference to FIGS. 19 and 20.

Figure 19:
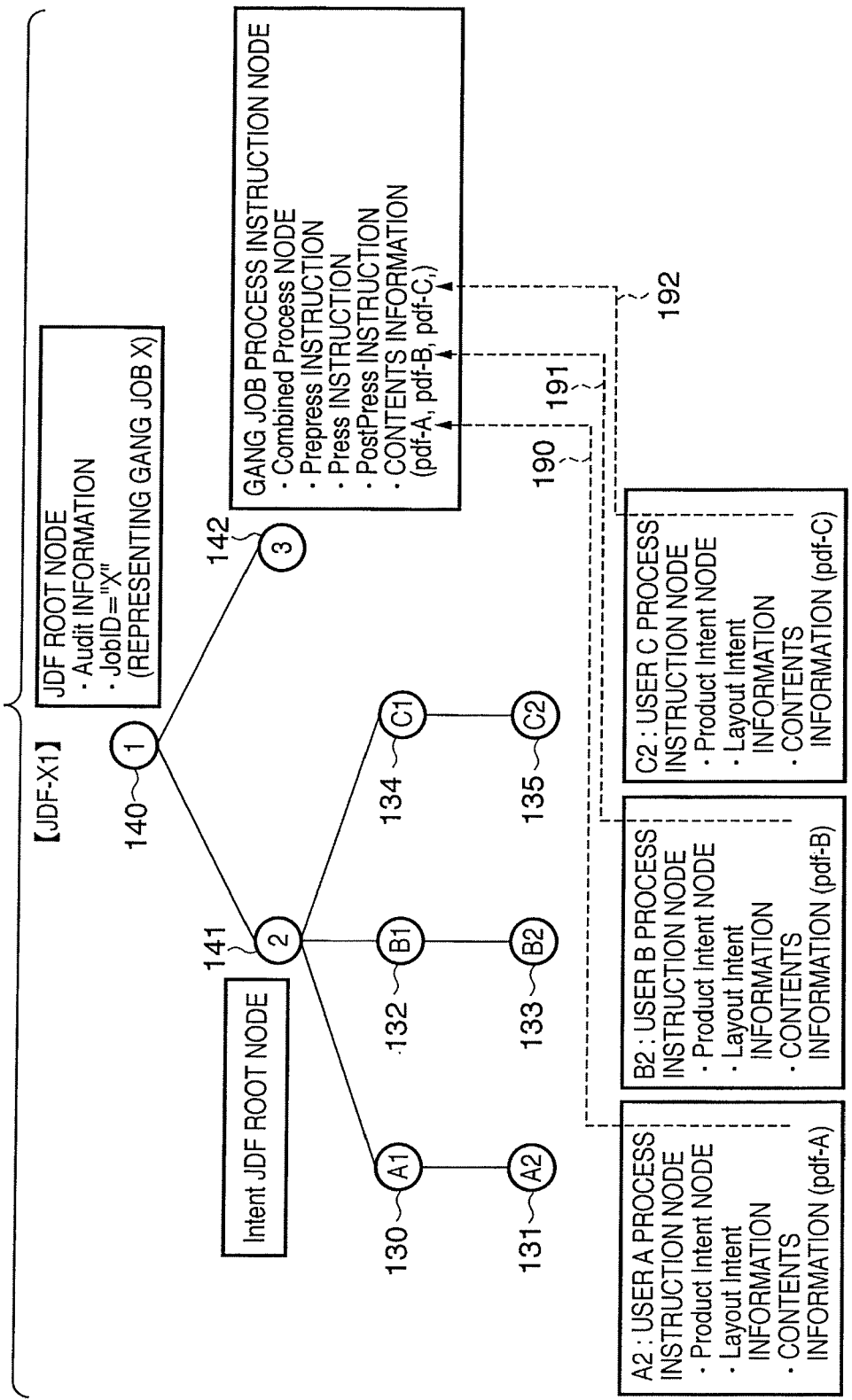
FIG. 19 is a view for explaining a JDF creation method according to the first embodiment of the present invention.

FIG. 19 is a view showing a method of extracting contents information and relationship information of original jobs (before being combined into a gang job) from the JDF-X1 117 received from the MIS server 20.

A node 142 describes a Prepress instruction and Press instruction including an Imposition instruction (instruction about the layout of contents) from the MIS server 20 to the color MFP 37. In addition, the node 142 describes a PostPress instruction (cutting method, packaging method, and the like), and contents information (contents name for use and the location of the contents).

Pieces of contents information 190 to 192 each representing a user of a job and contents used (PDF in the first embodiment) can be acquired below a node 141 recording the JDFs of original jobs. The pieces of contents information 190 to 192 make it possible to determine users whose products are created.

Figure 20:
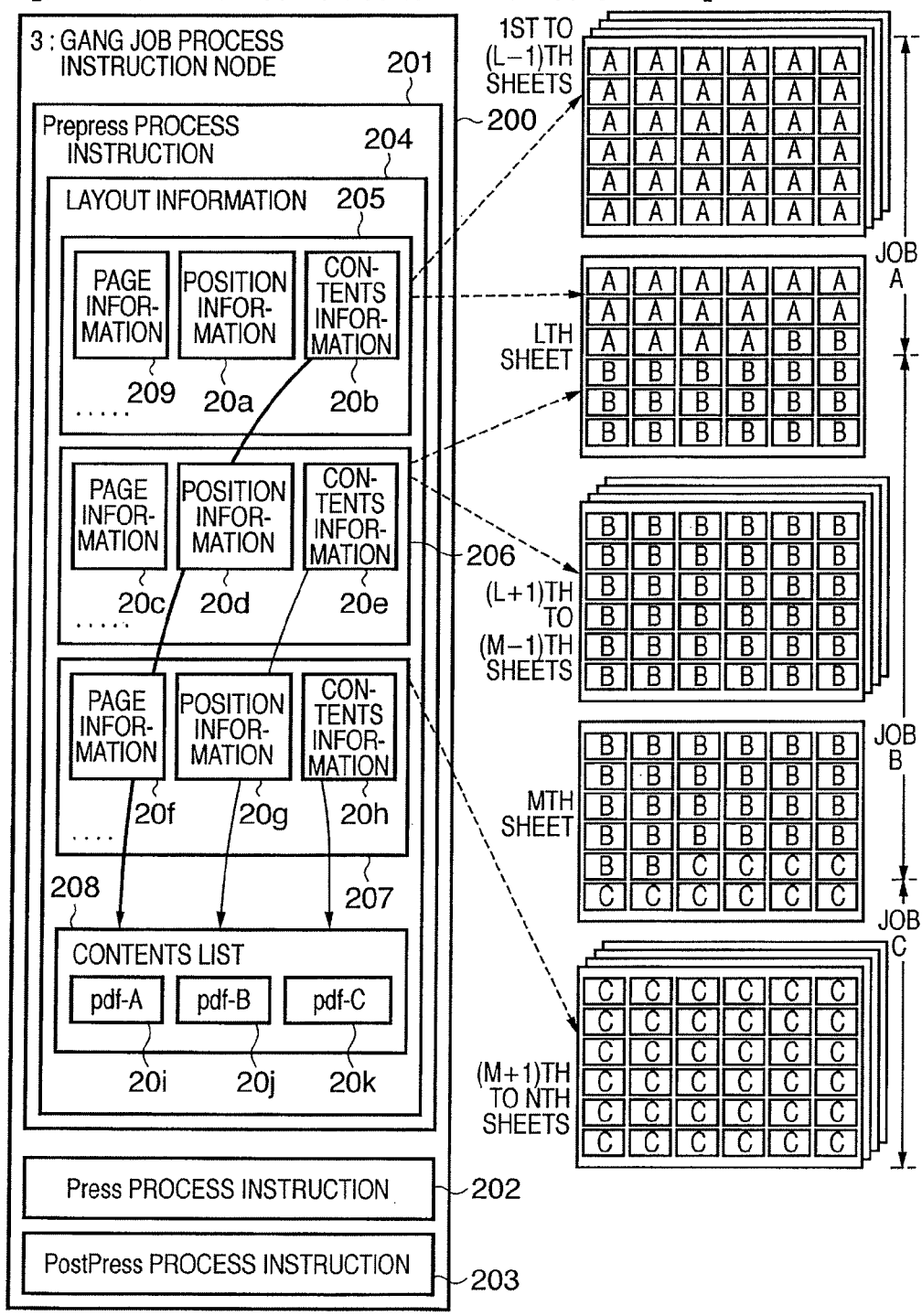
FIG. 20 is a view for explaining the JDF creation method according to the first embodiment of the present invention.

FIG. 20 is a view showing a method of extracting contents information and relationship information representing the pages, positions, and layout of contents from the JDF-X1 117 received from the MIS server 20.

Reference numeral 200 denotes a node representing the gang job process instruction node 142. Reference numeral 201 denotes a Prepress process instruction; 202, a Press process instruction; and 203, a PostPress process instruction.

Reference numerals 205 to 207 denote pieces of layout information of respective contents each representing the correspondence between each page of the contents, and the page and position where contents are laid out and output. Reference numeral 209 denotes page information representing the page number of an output document sheet; 20a, position information representing the position where the page is laid out; and 20b, contents information representing an object for use on a page of contents. The page information 209, position information 20a, and contents information 20b form one record. The layout information 205 holds records as instruction information by the number of contents pages.

Similarly, reference numeral 20c denotes page information representing the page number of an output document sheet; 20d, position information representing the position where the page is laid out; and 20e, contents information representing an object for use on a page of contents. Reference numeral 20f denotes page information representing the page number of an output document sheet; 20g, position information representing the position where the page is laid out; and 20h, contents information representing an object for use on a page of contents.

Reference numeral 208 denotes a contents information recording field (contents list) where pieces of contents information are recorded. In the contents information recording field 208, 20i represents the file name and location of pdf-A, 20j represents those of pdf-B, and 20k represents those of pdf-C.

The pieces of contents information 20b, 20e, and 20h are recorded as information in the contents information recording field 208. Since the layout position of a given content on an output document sheet can be recognized, a cutting instruction in the JDF-Y 160 for each user can be created by extracting contents position information for each user from the layout information of the JDF-X1 117.

Processes by the digital printing section 5 and PostPress section 6 will be explained with reference to the flowcharts of FIGS. 21 and 22.

A process by the digital printing section 5 will be described with reference to FIGS. 21 and 17.

Figure 21:
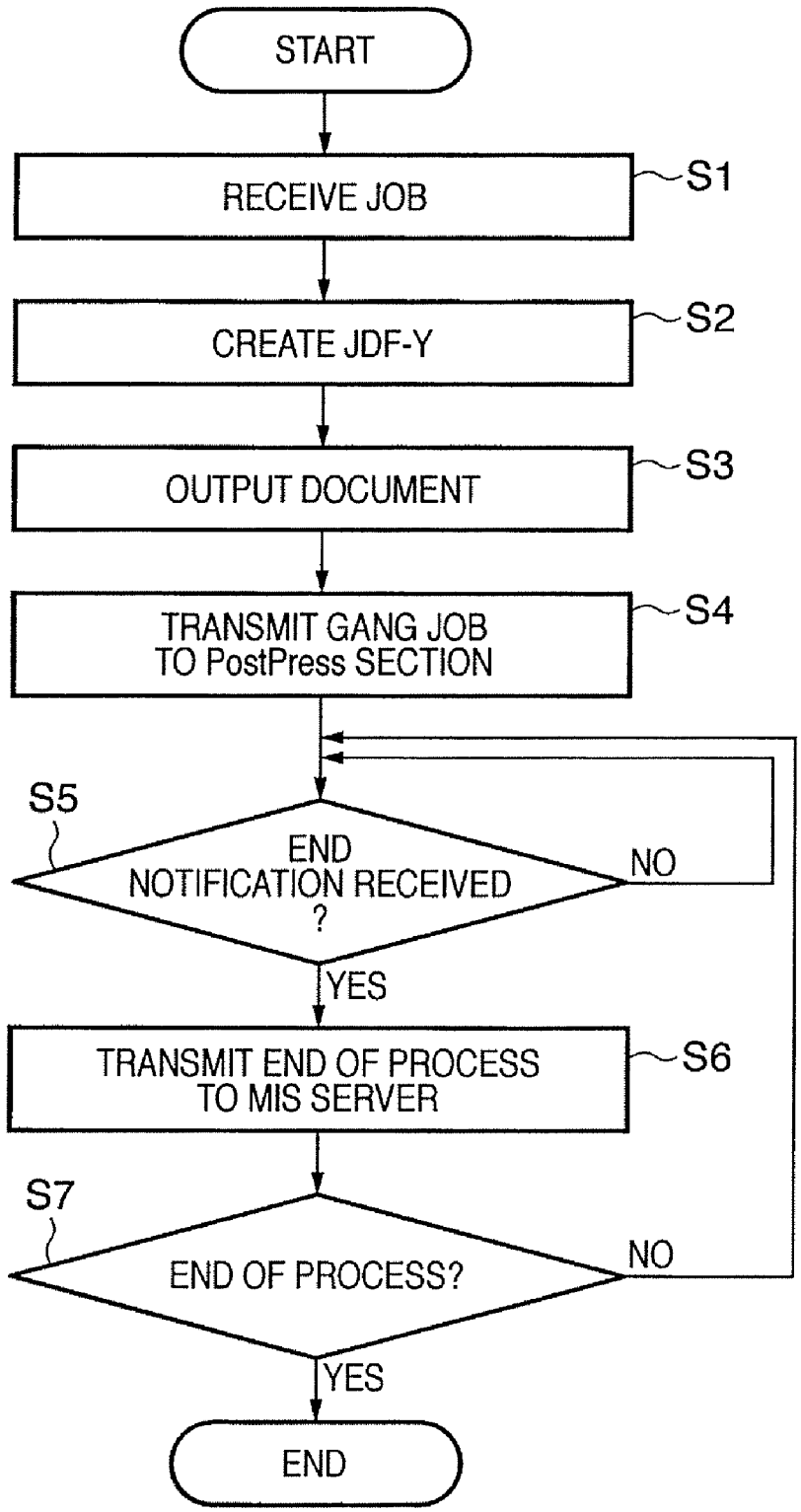
FIG. 21 is a flowchart for explaining a process by a digital printing section according to the first embodiment of the present invention.

FIG. 21 is a flowchart for explaining a process by the digital printing section according to the first embodiment of the present invention.

In step S1, the digital printing section 5 receives a job from the MIS server 20. Step S1 corresponds to (1) in FIG. 17. In step S2, the color MFP 37 creates the JDF-Y 160 on the basis of the JDF-X1 117. Step S2 corresponds to (2) in FIG. 17.

In step S3, the color MFP 37 outputs a document in accordance with the work procedures of the JDF-Y 160 created in step S2. Step S3 corresponds to (3) in FIG. 17, and an output document as shown in FIG. 10 is obtained. In step S4, the color MFP 37 transmits the JDF-Y 160 serving as a gang job to the PostPress server 40 of the PostPress section 6. Step S4 corresponds to (4) in FIG. 17.

In step S5, the color MFP 37 determines whether it has received an end notification from the PostPress server 40. If the color MFP 37 has not received any end notification (NO in step S5), the process waits until the color MFP 37 receives an end notification. If the color MFP 37 has received an end notification (YES in step S5), the process advances to step S6. Step 5 corresponds to (7), (9), and (11) in FIG. 17.

In step S6, the color MFP 37 transmits an end notification to the MIS server 20 in accordance with the received end notification.

In step S7, the color MFP 37 determines whether all the processes of the gang job have ended. If all the processes of the gang job have not ended (NO in step S7), the process returns to step S5. If all the processes of the gang job have ended (YES in step S7), the process ends.

A process by the PostPress section 6 will be described with reference to FIGS. 22 and 17.

Figure 22:
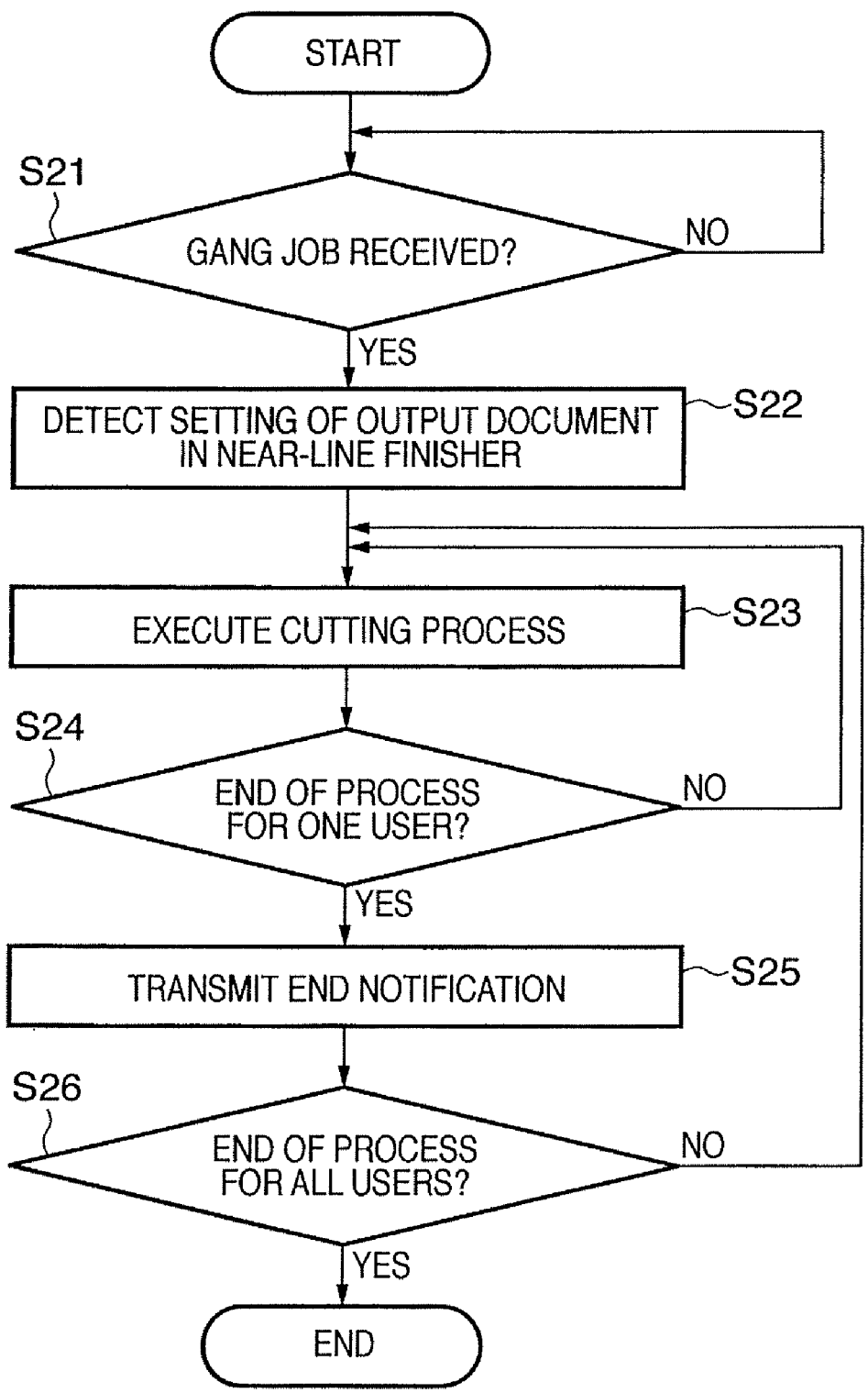
FIG. 22 is a flowchart for explaining a process by a PostPress section according to the first embodiment of the present invention.

FIG. 22 is a flowchart for explaining a process by the PostPress section according to the first embodiment of the present invention.

In step S21, the PostPress section 6 determines whether it has received a gang job from the color MFP 37. If the PostPress section 6 has not received any gang job (NO in step S21), the process waits until the PostPress section 6 receives a gang job. If the PostPress section 6 has received a gang job (YES in step S21), the process advances to step S22.

In step S22, the PostPress section 6 detects that the operator picked up an output document delivered on the output tray of the color MFP 37 and set it in the near-line finisher. Step S22 corresponds to (5) in FIG. 17. In step S23, the PostPress section 6 executes a cutting process in accordance with the instruction of the JDF-Y 160. Step S23 corresponds to (6) in FIG. 17.

In step S24, the PostPress section 6 determines whether the cutting process has ended for a given user. If no cutting process has ended (NO in step S24), the process returns to step S23. If the cutting process has ended (YES in step S24), the process advances to step S25.

In step S25, the PostPress section 6 transmits, to the color MFP 37, an end notification representing the end of the cutting process for the given user. Step S25 corresponds to (7), (9), and (11) in FIG. 17.

In step S26, the PostPress section 6 determines whether the cutting process has ended for all users. If the cutting process has not ended (NO in step S26), the process returns to step S23. If the cutting process has ended (YES in step S26), the process ends.

In the first embodiment, all the processes are executed in order, as shown in FIG. 17. However, processes by the PostPress section 6 and those by the color MFP 37 may proceed in parallel. For example, in FIG. 17, the color MFP 37 sends the end notification-A2 for user A to the MIS server 20, and then the near-line finisher executes the next cutting process to send the end notification-B1. Instead, for example, the near-line finisher may start the next cutting process immediately after transmitting the end notification-A1.

The first embodiment has described JDF as data representing work procedures, and PDF as contents, but the present invention is applicable to data of other formats. The PDF and JDF data formats are laid open to the public, their meanings, interpretation methods, and generation methods are well known, and a detailed description thereof are omitted.

In the first embodiment, a gang job is created by the MIS server 20, but may be created by another device (e.g., order receiving server) of the process management section or another device (e.g., color MFP 37) of the digital printing section 5.

In the first embodiment, an end notification from the PostPress section 6 is transmitted to the digital printing section 5, but may be transmitted to the process management section 4.

The first embodiment has described only the cutting process as a process by the PostPress section 6. However, the process by the PostPress section 6 may include the cutting process and the packaging process to package cards for each user. In this case, a process after the cutting process in the first embodiment is not a process to send an end notification, but a process to transfer a job to the packaging unit for the next process.

As described above, the first embodiment can send a process end notification to each job generating user during a gang job of merged jobs, and can shorten the process wait time of each user.

Even after a job is changed into a gang job, the job can be transferred to the next process for each user to shorten the total work process time of each user.

<Second Embodiment>

The second embodiment will be described with reference to FIGS. 23 to 26.

In the second embodiment, a color MFP 37 creates a gang job, and a PostPress section 6 transmits an end notification to a process management section 4.

Figure 23:
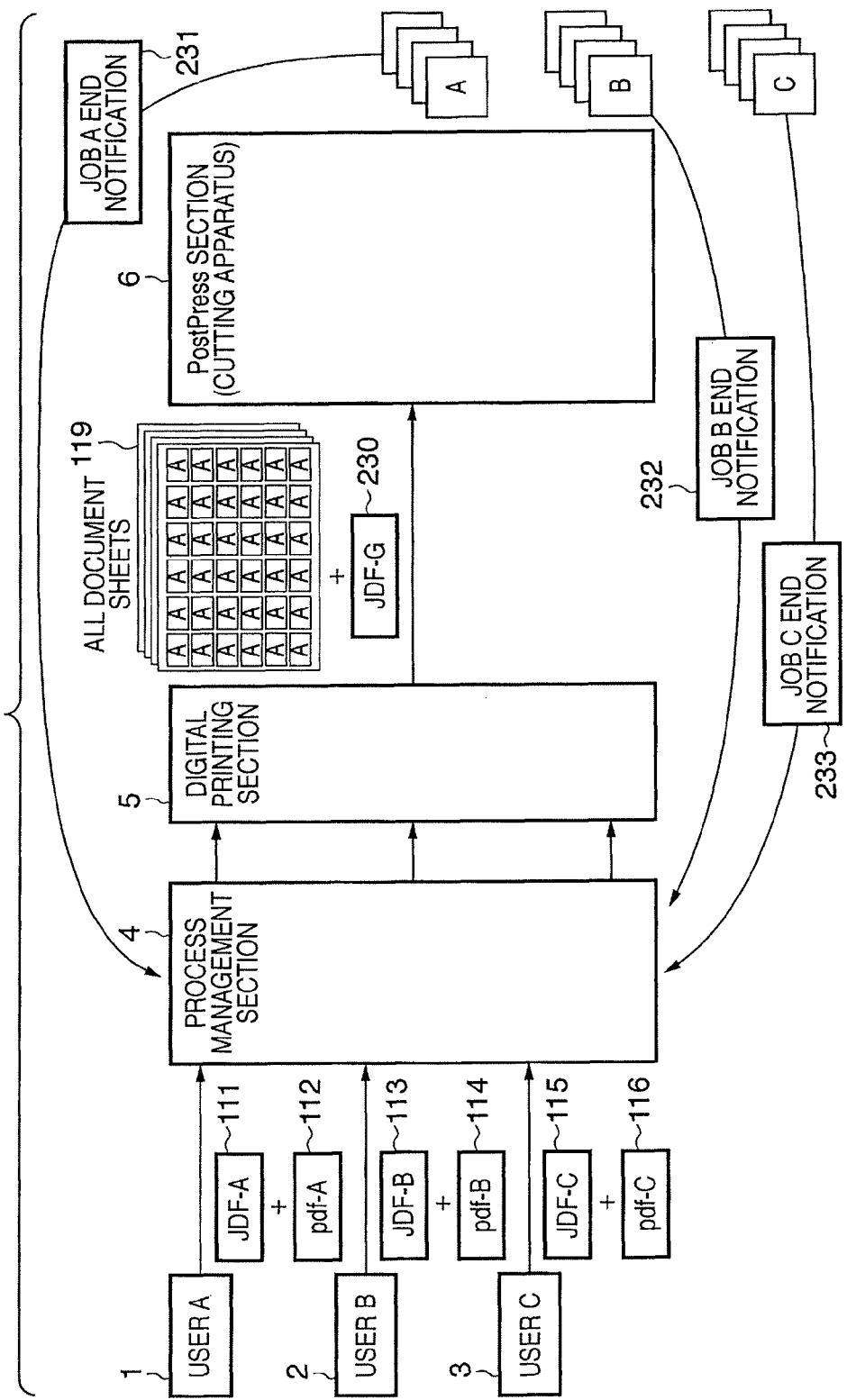
FIG. 23 is a view for explaining a job process sequence according to the second embodiment of the present invention.

FIG. 23 is a view for explaining a job process sequence according to the second embodiment of the present invention.

In the second embodiment, a JDF-A 111 and pdf-A 112, a JDF-B 113 and pdf-B 114, and a JDF-C 115 and pdf-C 116 which form jobs of users A, B, and C, respectively, are transmitted to the color MFP 37 of a digital printing section 5.

The color MFP 37 creates a JDF-G 230 serving as a gang job from received jobs of the three users, and transmits the JDF-G 230 to the PostPress section 6 together with an output document 119 after the output process. Details of the JDF-G 230 will be described later. Every time the cutting process ends for each user, a PostPress server 40 of the PostPress section 6 transmits a job A end notification 231, job B end notification 232, and job C end notification 233 to a MIS server 20 of the process management section 4.

Figure 24:
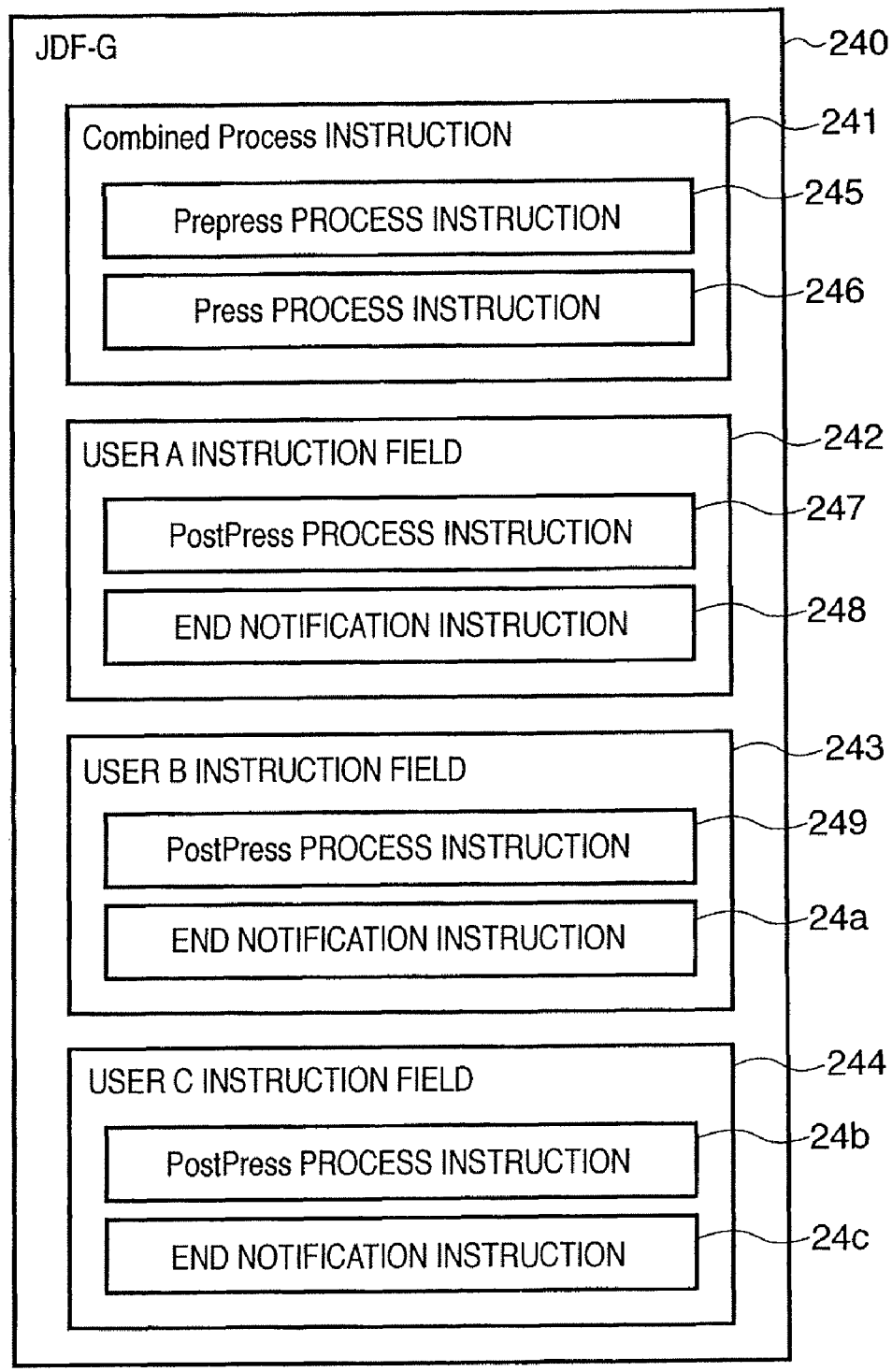
FIG. 24 is a view for explaining the structure of a JDF-G serving as a gang job according to the second embodiment of the present invention.

FIG. 24 is a view for explaining the structure of the JDF-G serving as a gang job according to the second embodiment of the present invention.

The second embodiment does not record original job information shown in FIG. 13.

Reference numeral 240 denotes an entire JDF-G. Reference numeral 241 denotes a Combined Process instruction configured to execute the Prepress and Press processes once. Reference numeral 245 denotes a Prepress process instruction of a gang job. Reference numeral 246 denotes a Press process instruction of the gang job.

Reference numeral 242 denotes a user A instruction field describing generation of a user A product and a notification process. Reference numeral 247 denotes a PostPress process instruction to generate a user A product. Reference numeral 248 denotes a process end notification instruction for user A.

Similarly, reference numeral 243 denotes a user B instruction field describing generation of a user B product and a notification process. Reference numeral 249 denotes a PostPress process instruction to generate a user B product. Reference numeral 24a denotes a process end notification instruction for user B.

Reference numeral 244 denotes a user C instruction field describing generation of a user C product and a notification process. Reference numeral 24b denotes a PostPress process instruction to generate a user C product. Reference numeral 24c denotes a process end notification instruction for user C.

In the second embodiment, the operator generates, from the JDF-A, JDF-B, and JDF-C serving as original job instructions, the Prepress process instruction 245 to designate contents for use in the JDF-G serving as a gang job and the layout of the contents. However, the PostPress process instructions 247, 249, and 24b are generated from the Prepress process instruction 245 by the same method as that of the first embodiment.

Figure 25:
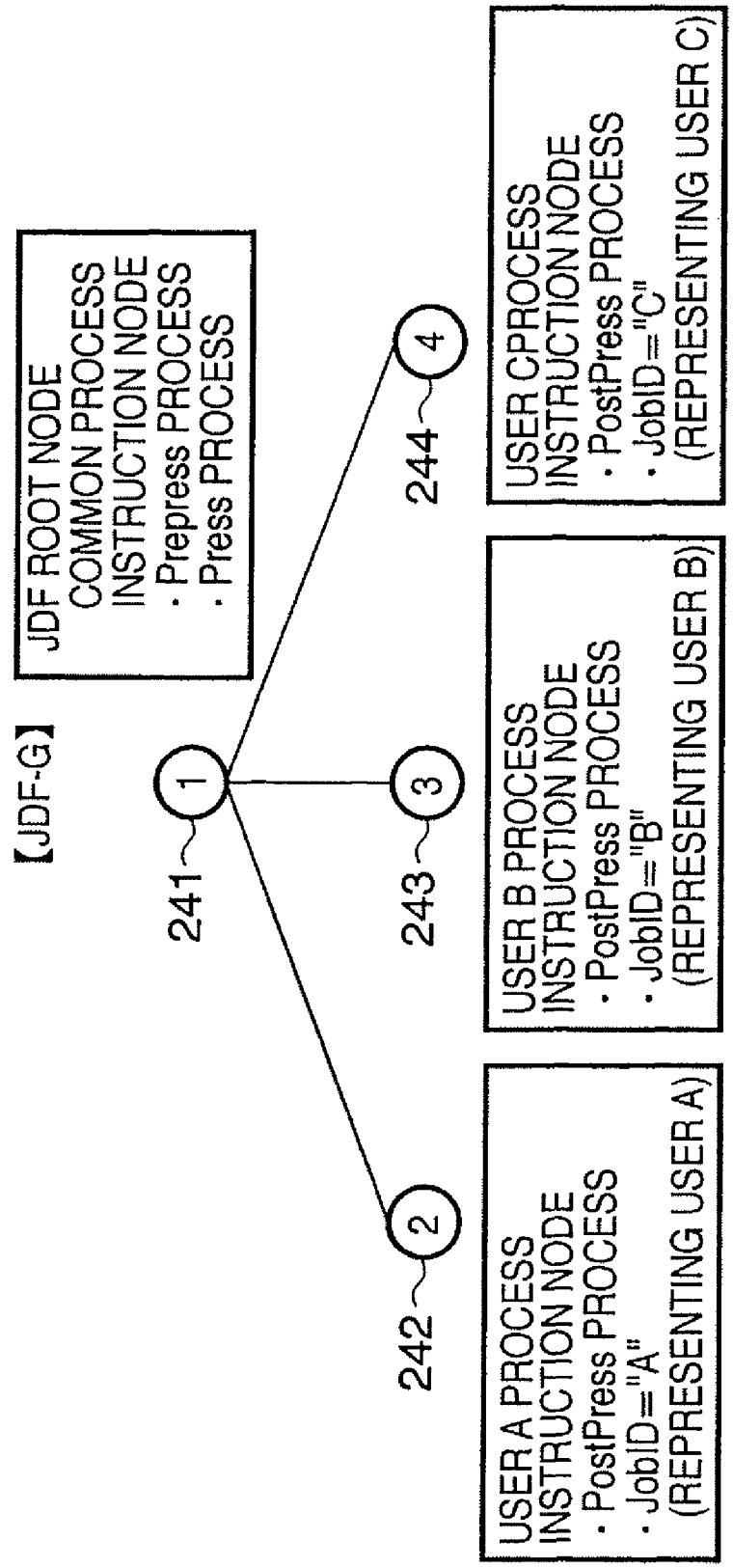
FIG. 25 is a view for explaining a JDF structure according to the second embodiment of the present invention.

FIG. 25 is a view for explaining the structure of the JDF-G as an XML node hierarchical structure.

Reference numerals 241 to 244 correspond to building elements of the same reference numerals in FIG. 24. The user A process instruction node 242 records Job ID ("A") representing a job of user A. The user B process instruction node 243 records Job ID ("B") representing a job of user B. The user C process instruction node 244 records Job ID ("C") representing a job of user C.

A process by the digital printing section 5 according to the second embodiment will be described with reference to FIG. 26.

Figure 26:
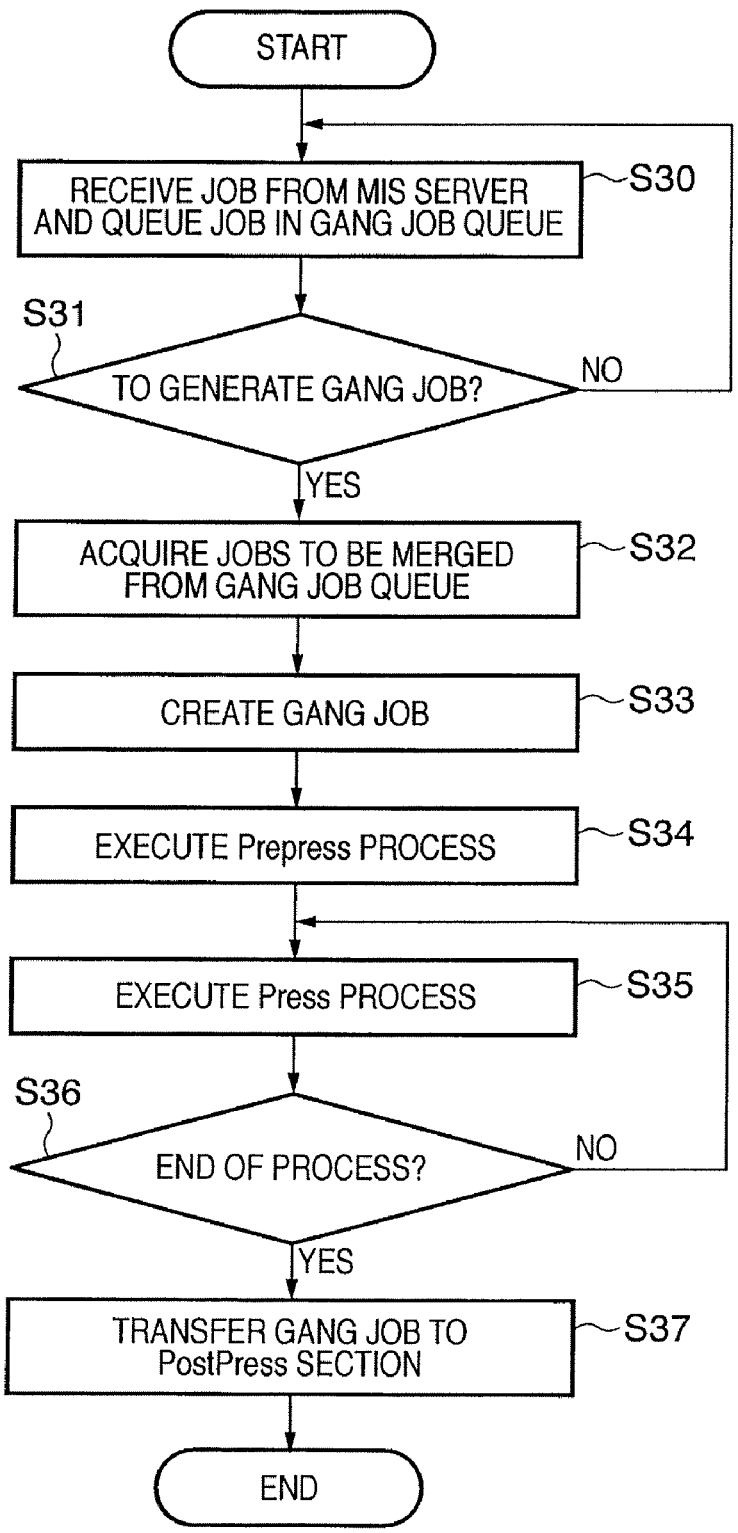
FIG. 26 is a flowchart for explaining a process by a digital printing section according to the second embodiment of the present invention.

FIG. 26 is a flowchart for explaining a process by the digital printing section according to the second embodiment of the present invention.

In step S30 the digital printing section 5 receives a job from the MIS server 20. The color MFP 37 receives a job (JDF-A) of user A from the MIS server 20, and queues the received job in a gang job queue.

In step S31, the color MFP 37 determines whether to generate a gang job in accordance with a determination criterion such as the number of jobs or the job size registered in the system in advance. If the color MFP 37 determines not to generate a gang job, the process returns to step S30 to receive the next job. In the second embodiment, the color MFP 37 receives the next jobs (JDF-B and JDF-C of users B and C) from the MIS server 20.

If the color MFP 37 determines to generate a gang job (YES in step S31), the process advances to step S32 to acquire jobs queued in the gang job queue. In step S33, the color MFP 37 generates a gang job from the jobs queued in the gang job queue. In the second embodiment, the color MFP 37 merges the received jobs JDF-A, JDF-B, and JDF-C into a gang job (JDF-G). The gang job records an instruction to send an end notification to the MIS server 20 at the end of the PostPress process of the job of each user.

In step S34, the color MFP 37 executes the Prepress process to generate raster data of an output document in accordance with the work procedures of the JDF-G. In step S35, the color MFP 37 executes the Press process using the raster image data generated in the Prepress process.

In step S36, the color MFP 37 determines whether the Press process has ended for all jobs. If no Press process has ended (NO in step S36), the process returns to step S35 to continue the Press process. If the Press process has ended (YES in step S36), the process advances to step S37 to transmit the gang job JDF-G to the PostPress server 40 of the PostPress section 6. Then, the process by the digital printing section 5 ends.

The subsequent process by the PostPress section 6 is almost the same as that in the first embodiment except that the PostPress section 6 transmits an end notification for each user to the MIS server 20. This is because the JDF-G describes that the MIS server 20 is a notification destination.

As described above, the second embodiment can adaptively designate a process notification destination in a gang job in accordance with application purposes, in addition to the effects described in the first embodiment. A job process end notification can be transmitted to an intended destination.

<Third Embodiment>

The third embodiment will be described with reference to FIGS. 27 and 28.

In the second embodiment, the color MFP 37 transmits a gang job only once to the PostPress section 6 at the end of the Press process for all jobs. In the third embodiment, the job transmitted from a color MFP 37 to a PostPress section 6 is divided for each user.

Figure 27:
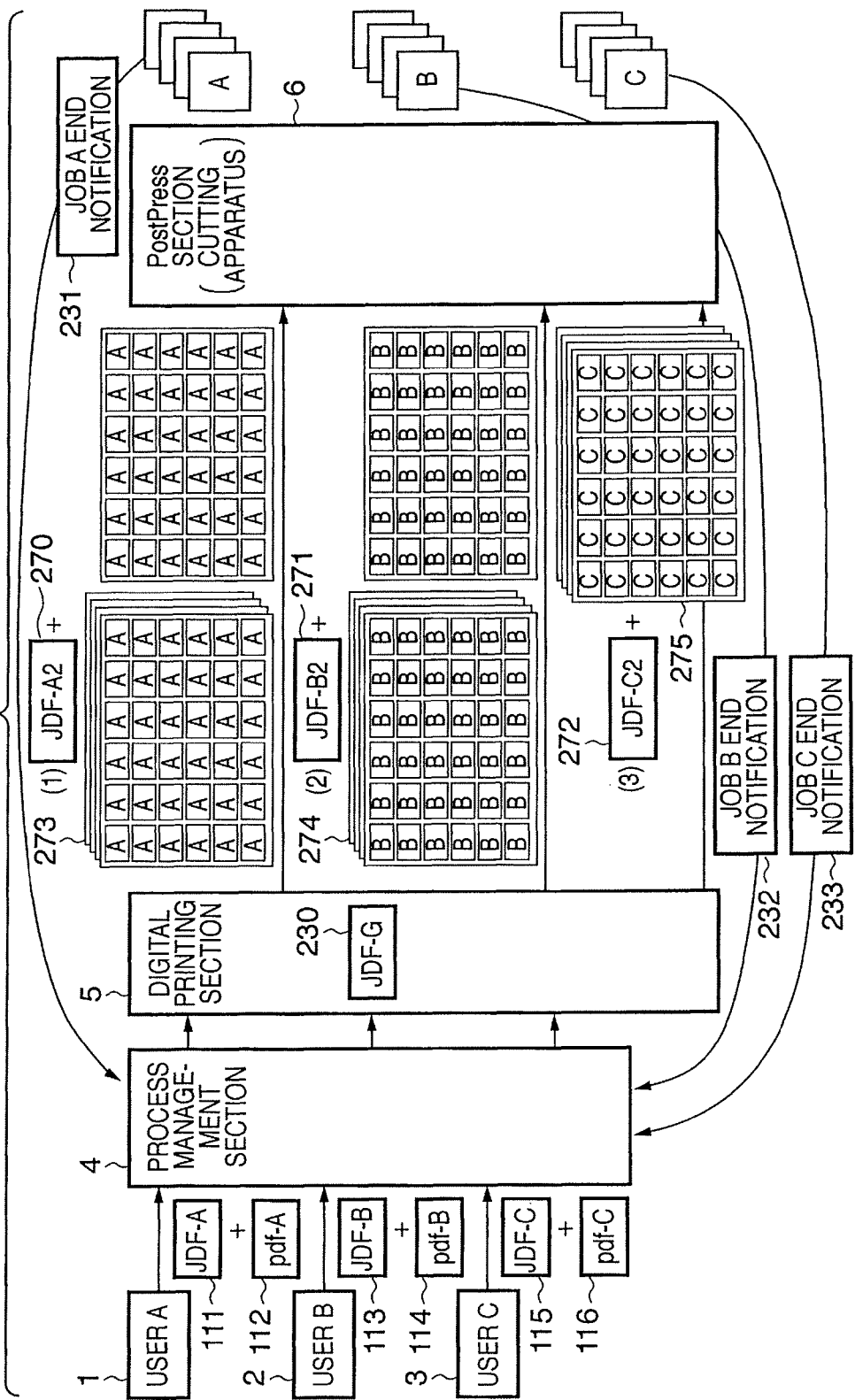
FIG. 27 is a view for explaining a job process sequence according to the third embodiment of the present invention.

FIG. 27 is a view for explaining a job process sequence according to the third embodiment of the present invention.

The process sequence in the third embodiment is the same as that in the second embodiment up to creation of a JDF-G 230 serving as a gang job by the color MFP 37 in a digital printing section 5. In the third embodiment, the color MFP 37 transmits a job to the PostPress section 6 for each user. In the third embodiment, the color MFP 37 transmits jobs to the PostPress section 6 three times.

A JDF-A2 270 is transmitted at the end of outputting a document for user A. The JDF-A2 270 describes a cutting process and end notification process instruction for user A. The JDF-A2 270 describes the same instruction as that of a user A process instruction node 242 in FIG. 25. An output document 273 is obtained at this time. The output document 273 corresponds to the first to Lth output document sheets in FIG. 10.

A JDF-B2 271 is transmitted at the end of outputting a document for user B. The JDF-B2 271 describes a cutting process and end notification process instruction for user B. The JDF-B2 271 describes the same instruction as that of a user B process instruction node 243 in FIG. 25. An output document 274 is obtained at this time. The output document 274 corresponds to the (L+1)th to Mth output document sheets in FIG. 10.

A JDF-C2 272 is transmitted at the end of outputting a document for user C. The JDF-C2 272 describes a cutting process and end notification process instruction for user C. The JDF-C2 272 describes the same instruction as that of a user C process instruction node 244 in FIG. 25. An output document 275 is obtained at this time. The output document 275 corresponds to the (M+1)th to Nth output document sheets in FIG. 10.

A process by the digital printing section 5 according to the third embodiment will be described with reference to FIG. 28.

Figure 28:
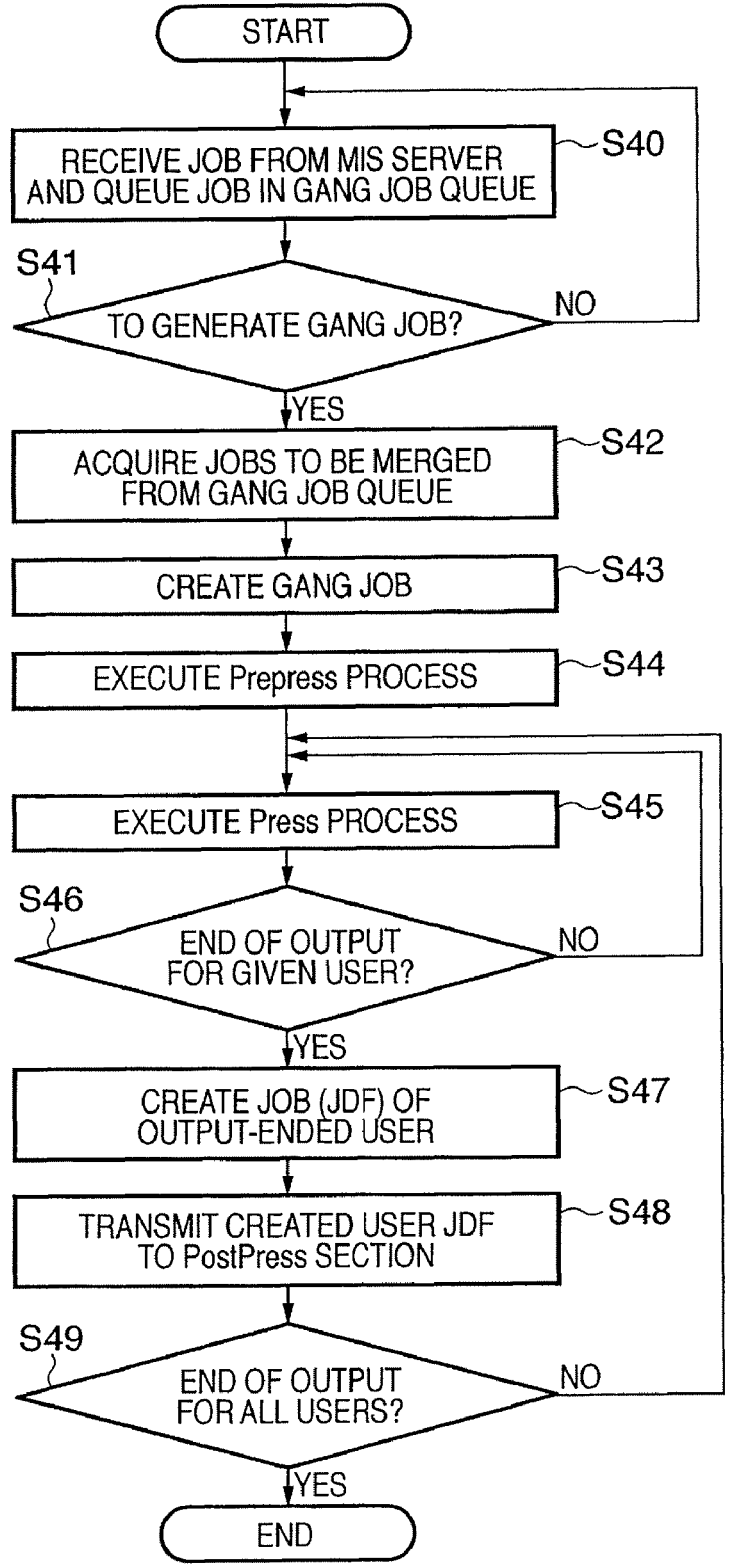
FIG. 28 is a flowchart for explaining a process by a digital printing section according to the third embodiment of the present invention.

FIG. 28 is a flowchart for explaining a process by the digital printing section according to the third embodiment of the present invention.

Steps S40 to S44 are identical to steps S30 to S34 in FIG. 26 according to the second embodiment, and a description thereof will be omitted.

In step S45, the color MFP 37 executes the Press process in accordance with the work procedures of the created JDF-G. In step S46, the color MFP 37 determines whether the Press process has ended for a given user. If no Press process has ended (NO in step S46), the process returns to step S45 to continue the Press process.

If the Press process has ended (YES in step S46), the color MFP 37 generates a JDF corresponding to the output-ended user as a work instruction to the PostPress section 6 in step S47. In the third embodiment, a node describing the PostPress process and notification process corresponding to the output-ended user in the JDF-G 230 in FIG. 27 is transmitted as an instruction to the PostPress section 6. More specifically, when the Press process ends for user A, the color MFP 37 creates only the node 242 in FIG. 25 as a work instruction to the PostPress section 6. When the Press process ends for user B, the color MFP 37 creates only the node 243 in FIG. 25 as a work instruction to the PostPress section 6. When the Press process ends for user C, the color MFP 37 creates only the node 244 in FIG. 25 as a work instruction to the PostPress section 6.

In step S48, the color MFP 37 transmits the JDF created in step S47 to a PostPress server 40 of the PostPress section 6.

In step S49, the color MFP 37 determines whether the Press process has ended for all users. If the Press process has not ended (NO in step S49), the process returns to step S45 to continue the Press process. If the Press process has ended (YES in step S49), the process ends.

The subsequent process by the PostPress section 6 is almost the same as that in the first embodiment. The operator repetitively sets output documents discharged onto the output tray of the color MFP 37 in the near-line finisher for respective users. In the third embodiment, jobs of three users A, B, and C form a gang job, so the operator sets output documents three times, as shown in FIG. 27.

As described above, the third embodiment can shift a job of one user to the PostPress process upon of the Press process for the job, and at the same time, can execute the Press process for the next job. The third embodiment can execute the process more efficiently.

<Fourth Embodiment>

In the first to third embodiments, when the PostPress section 6 ends the PostPress process for each user of a gang job, it sends an end notification to the color MFP 37 of the digital printing section 5. However, the present invention is not limited to this. For example, when the color MFP 37 ends the Prepress and Press processes, i.e., when output (printing) of a document is complete, the color MFP 37 may send a notification to the process management section 4 prior to execution of the PostPress process in accordance with application purposes.

The configuration of the fourth embodiment will now be described.

Figure 29:
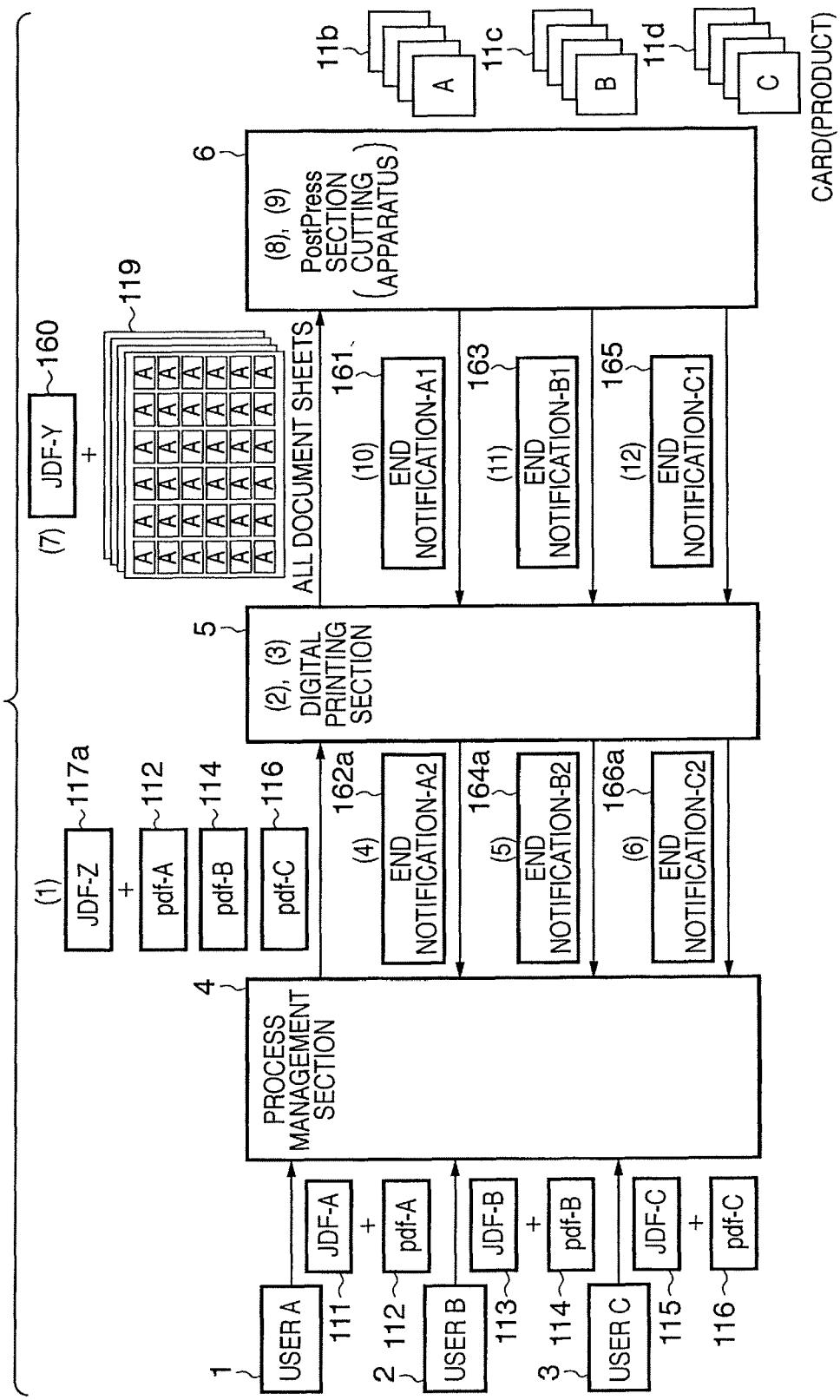
FIG. 29 is a view for explaining a job process sequence according to the fourth embodiment of the present invention.

FIG. 29 is a view for explaining a job process sequence and process order according to the fourth embodiment of the present invention. In FIG. 29, a description of processes common to those in FIGS. 16 and 17 will be omitted.

In FIG. 29, a JDF-Z 117a is a gang job generated by a MIS server 20. The JDF-Z 117a describes work procedures to notify the MIS server 20 of the end of the processes, when the Prepress and Press processes end for each user of a gang job. The JDF-Z 117a can be generated according to the method of generating the JDF-Y 160 in the first embodiment. That is, the description contents of the JDF are processed in accordance with the contents of a process by each device in the system.

An end notification-A2 162a is a user A job process end notification sent from a color MFP 37 to the MIS server 20 of a process management section 4 at the end of outputting a document targeted by a job of user A. Similarly, an end notification-B2 164a is a user B job process end notification sent from the color MFP 37 to the MIS server 20 of the process management section 4 at the end of outputting a document targeted by a job of user B. An end notification-C2 166a is a user C job process end notification sent from the color MFP 37 to the MIS server 20 of the process management section 4 at the end of outputting a document targeted by a job of user C.

The process order of the data flow in FIG. 29 is different from that in FIG. 17 according to the first embodiment.

(1) represents reception of a job. A digital printing section 5 receives, from the MIS server 20, a gang job (JDF-Z 117a) of merged jobs of users A, B, and C.

(2) represents creation of the JDF-Y 160. The digital printing section 5 creates the JDF-Y 160 from the gang job (JDF-Z 117a). The JDF-Y 160 describes an instruction to perform a cutting process for user A and return the end of the cutting process to the device, an instruction to perform a cutting process for user B and return the end of the cutting process to the device, and an instruction to perform a cutting process for user C and return the end of the cutting process to the device.

(3) represents output of a document. The digital printing section 5 executes the Prepress and Press processes of the gang job (JDF-Z 117a).

(4) represents transmission of an end notification. At the end of the job process (printing) for user A, the digital printing section 5 transmits a user A job end notification to the MIS server 20 in accordance with the instruction of the JDF-Z 117a.

(5) represents transmission of an end notification. At the end of the job process (printing) for user B, the digital printing section 5 transmits a user B job end notification to the MIS server 20 in accordance with the instruction of the JDF-Z 117a.

(6) represents transmission of an end notification. At the end of the job process (printing) for user C, the digital printing section 5 transmits a user C job end notification to the MIS server 20 in accordance with the instruction of the JDF-Z 117a.

The processes (7) to (12) correspond to (4) to (6), (7), (9), and (11) in FIG. 17, and a description thereof will be omitted.

A configuration of sending an end notification from a Post-Press section 6 to the digital printing section 5 may be employed in accordance with application purposes. Especially when an end notification from the PostPress section 6 to the digital printing section 5 is unnecessary, a JDF-X2 118 in FIG. 12 in the conventional configuration suffices to be generated instead of the JDF-Y 160.

Figure 30:
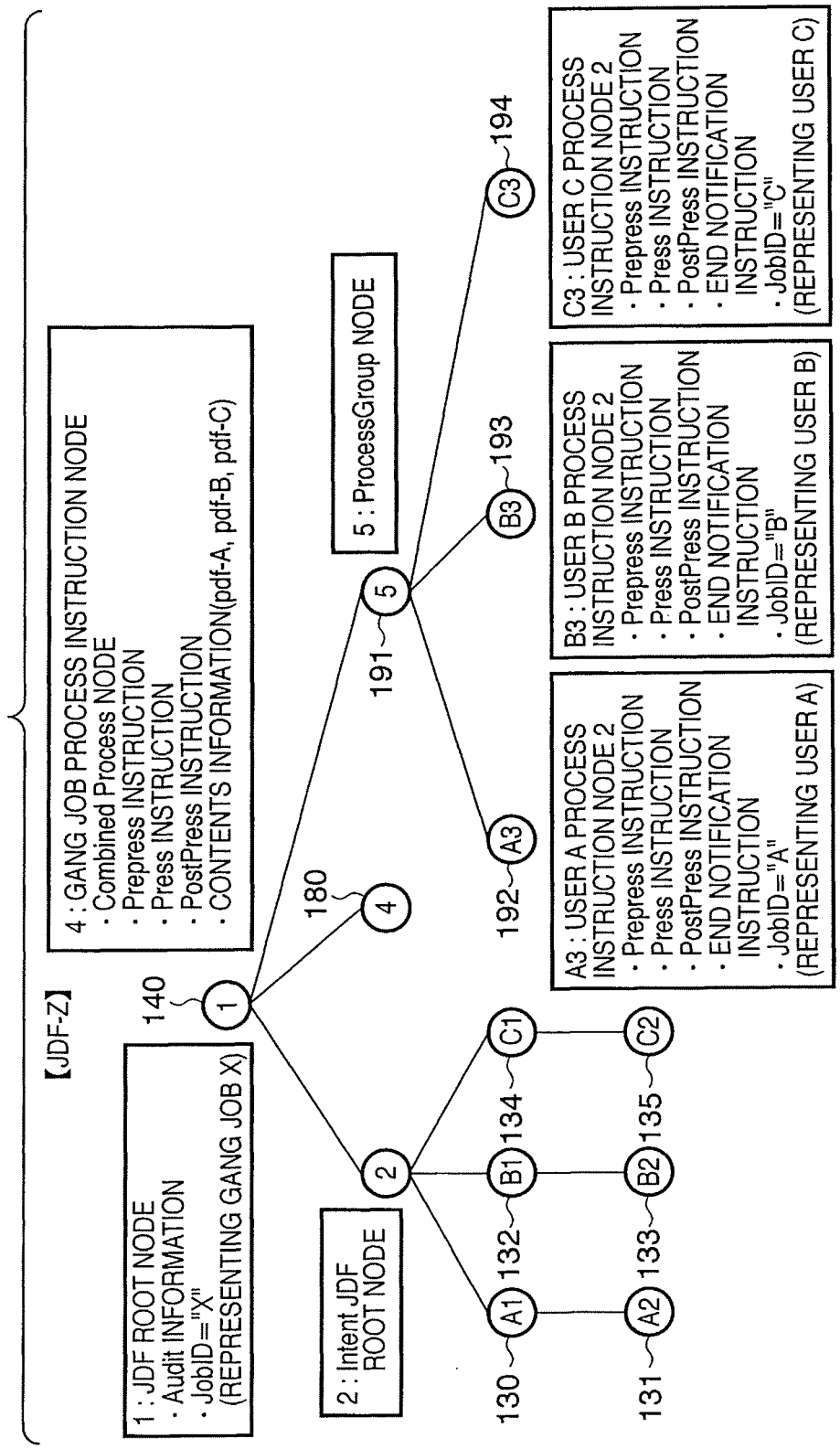
FIG. 30 is a view for explaining a JDF structure according to the fourth embodiment of the present invention.

FIG. 30 is a view for explaining the structure of the JDF-Z 117a.

The MIS server 20 generates the JDF-Z 117a. In FIG. 30, a description of building elements common to FIGS. 14 and 19 will be omitted accordingly.

The MIS server 20 newly creates nodes 191 to 194.

The node 191 is a ProcessGroup node which groups the nodes 192 to 194.

The node 192 is a user A process instruction node, and describes a Prepress instruction, Press instruction, PostPress instruction, end notification instruction, and Job ID ("A") representing user A. The node 192 records Prepress and Press instructions serving as process instructions to only print the card of user A, and a PostPress instruction serving as a cutting instruction to create only the card of user A. In addition, the node 192 records an end notification instruction to send an end notification to the MIS server 20 at the end of the Prepress and Press processes. The node 192 further records Job ID representing the type of job added to an end notification. The digital printing section 5 performs the print process and end notification process in accordance with these instructions.

Similarly, the node 193 is a user B process instruction node, and describes a Prepress instruction, Press instruction, Post-Press instruction, end notification instruction, and Job ID ("B") representing user B. The node 194 is a user C process instruction node, and describes a Prepress instruction, Press instruction, PostPress instruction, end notification instruction, and Job ID ("C") representing user C.

Processes by the process management section 4 and digital printing section 5 will be explained with reference to the flowcharts of FIGS. 31 and 32.

A process by the process management section 4 will be described with reference to FIGS. 31 and 29.

Figure 31:
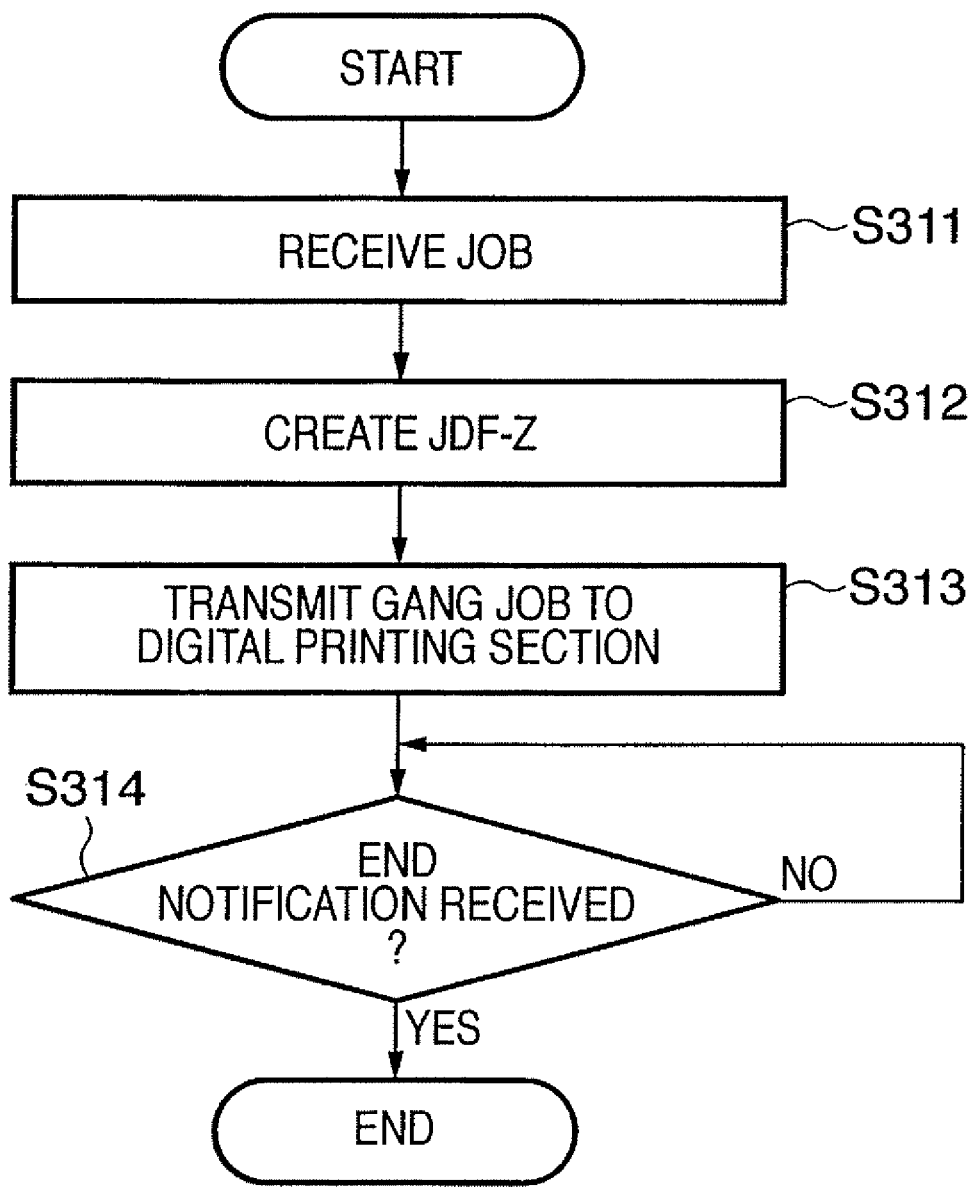
FIG. 31 is a flowchart for explaining a process by a process management section according to the fourth embodiment of the present invention.

FIG. 31 is a flowchart for explaining a process by the process management section according to the fourth embodiment of the present invention.

In step S311, the MIS server 20 receives jobs to be merged into a gang job from an order receiving server 21. In step S312, the MIS server 20 creates the JDF-Z 117a on the basis of the received jobs. In step S313, the MIS server 20 transmits the JDF-X1 117a serving as a gang job to the color MFP 37 of the digital printing section 5.

In step S314, the MIS server 20 determines whether it has received an end notification from the color MFP 37. If the MIS server 20 has not received any end notification (NO in step S314), the process waits until the MIS server 20 receives an end notification. If the MIS server 20 has received an end notification (YES in step S314), the process advances to step S6. This process corresponds to (4) to (6) in FIG. 29.

A process by the digital printing section 5 will be described with reference to FIGS. 32 and 29.

Figure 32:
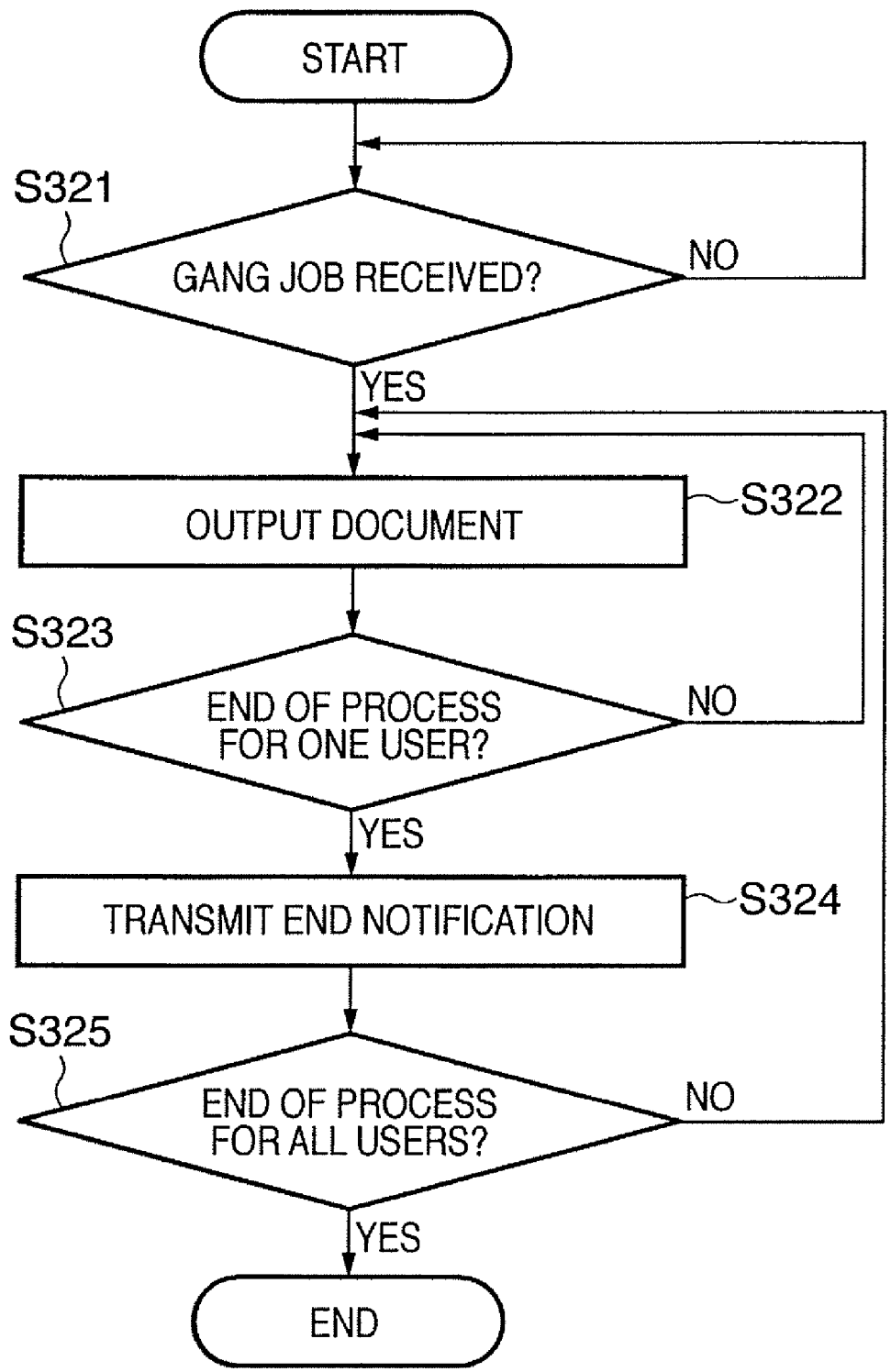
FIG. 32 is a flowchart for explaining a process by a digital printing section according to the fourth embodiment of the present invention.

FIG. 32 is a flowchart for explaining a process by the digital printing section according to the fourth embodiment of the present invention.

In step S321, the color MFP 37 determines whether it has received a gang job from the MIS server 20. If the color MFP 37 has not received any gang job (NO in step S321), the process waits until the color MFP 37 receives a gang job. If the color MFP 37 has received a gang job (YES in step S321), the process advances to step S322.

In step S322, the color MFP 37 creates the JDF-Y 160 on the basis of the JDF-Z 117a. This corresponds to (2) in FIG. 29. In addition, the color MFP 37 outputs a document in accordance with the work procedures of the JDF-Z 117a. This corresponds to (3) in FIG. 29.

In step S323, the color MFP 37 determines whether it has ended the print process (document output) for a given user. If no print process has ended (NO in step S323), the process returns to step S322. If the print process has ended (YES in step S323), the process advances to step S324.

In step S324, the color MFP 37 transmits, to the MIS server 20, an end notification representing the end of the print process for the given user. Step S324 corresponds to (4) to (6) in FIG. 29.

In step S325, the color MFP 37 determines whether the print process has ended for all users. If no print process has ended (NO in step S325), the process returns to step S322. If the print process has ended (YES in step S325), the process ends.

Thereafter, the color MFP 37 transmits the JDF-Y 160 serving as a gang job to a PostPress server 40 of the PostPress section 6. Alternatively, the color MFP 37 may transmit the JDF-Y 160 to the PostPress server 40 of the PostPress section 6 in parallel with the process in step S322.

In the fourth embodiment, all the processes are executed in order, as shown in FIG. 29. However, processes by the Post-Press section 6 and those by the color MFP 37 may proceed in parallel.

In the fourth embodiment, a gang job is created by the MIS server 20, but may be created by another device (e.g., order receiving server) of the process management section or another device (e.g., color MFP 37) of the digital printing section 5.

As described above, the fourth embodiment can send a process end notification to each job generating user during a gang job of merged jobs, and can shorten the process wait time of each user.

Even after a job is changed into a gang job, the job can be transferred to the next process for each user to shorten the total work process time of each user.

<Fifth Embodiment>

The first to fourth embodiments are merely examples, and an embodiment as an arbitrary combination of these embodiments can be implemented in accordance with application purposes.

Features of the present invention will be generalized as follows.

The present invention relates to a printing system which obtains a final printed material (final product) by sequentially transferring the process results of apparatuses from an upstream apparatus to a downstream apparatus. More specifically, the present invention relates to a printing system having a plurality of process apparatuses which execute processes from printing to bookbinding, and a job management apparatus which generates job management information representing the contents of a process by each process apparatus.

A feature of the present invention is to send an end notification of a process by a downstream apparatus to a designated destination. More specifically, the end notification is sent to at least one upstream apparatus. Alternatively, the end notification is sent to at least one downstream apparatus.

As an arrangement example of the upstream and downstream apparatuses, when the upstream apparatus is the process management section 4 in the embodiments, the downstream apparatus is the digital printing section 5 or PostPress section. When the upstream apparatus is the digital printing section 5, the downstream apparatus is the PostPress section 6.

In a printing system configured by the process management section 4, Prepress section 7, digital printing section 5, and PostPress section 6, the process management section 4, Prepress section 7, and digital printing section 5 may be upstream apparatuses in accordance with the end notification configuration. In contrast, the Prepress section 7, digital printing section 5, and PostPress section 6 may be downstream apparatuses.

When the printing system comprises a processing section other than the process management section 4, Prepress section 7, digital printing section 5, and PostPress section 6, building elements including the processing section may function as upstream or downstream apparatuses between them.

In some cases, building elements in the process management section 4, Prepress section 7, digital printing section 5, and PostPress section 6 function as upstream or downstream apparatuses.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Figure 33:
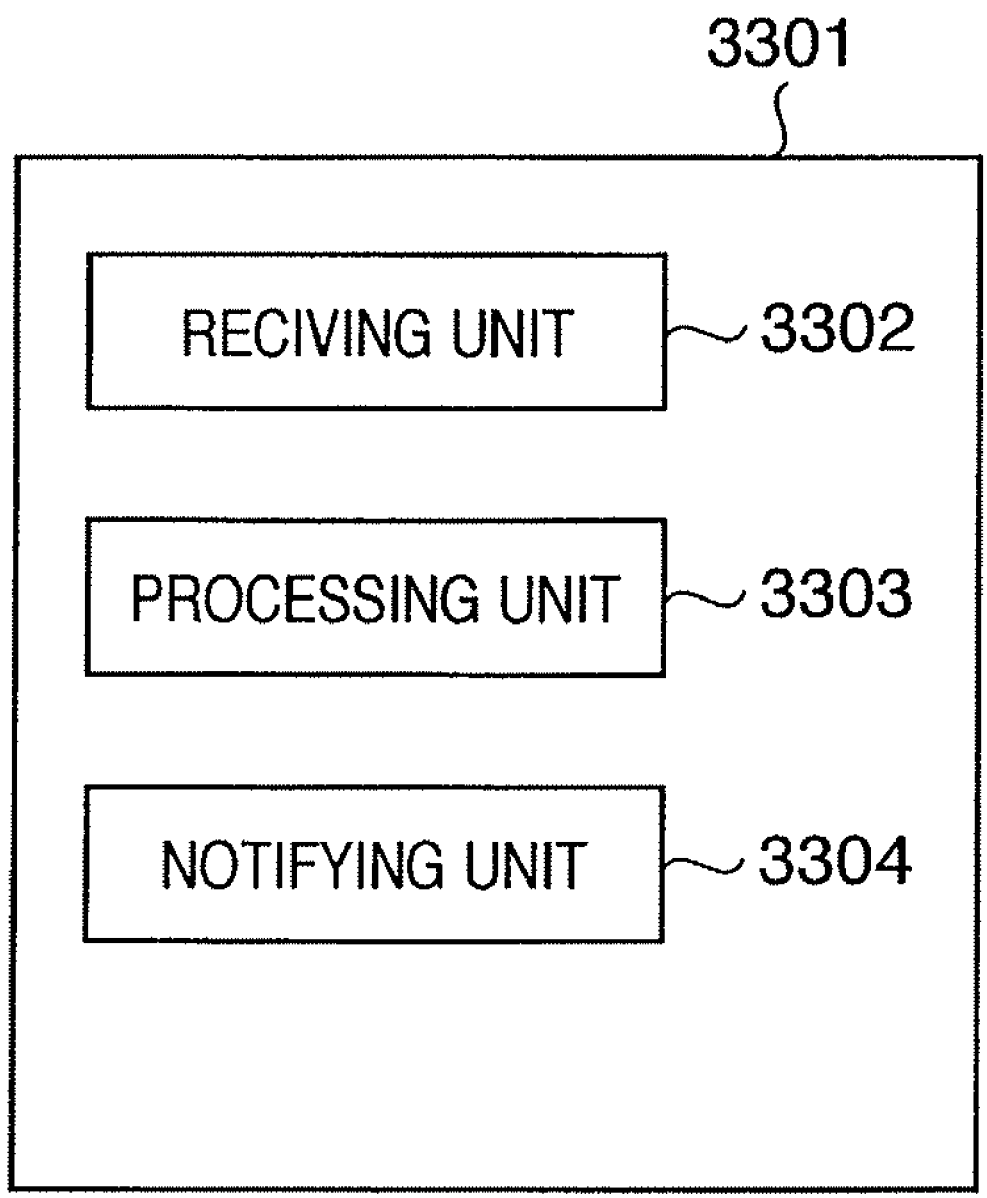
FIG. 33 is a block diagram showing an example of a process apparatus.

FIG. 33 is a block diagram showing an example of a process apparatus 3301. Receiving unit 3302 receives a merged job obtained by merging jobs from a upstream process apparatus which executes a process prior to said process apparatus. Processing unit 3303 processes the merged job on the basis of job management information representing process contents of the merged job received by the receiving unit 3302. Notifying unit 3304 transmits, to a designated destination, an end notification of a process by the processing unit 3303 for each of the jobs of the merged job.

Figure 34:
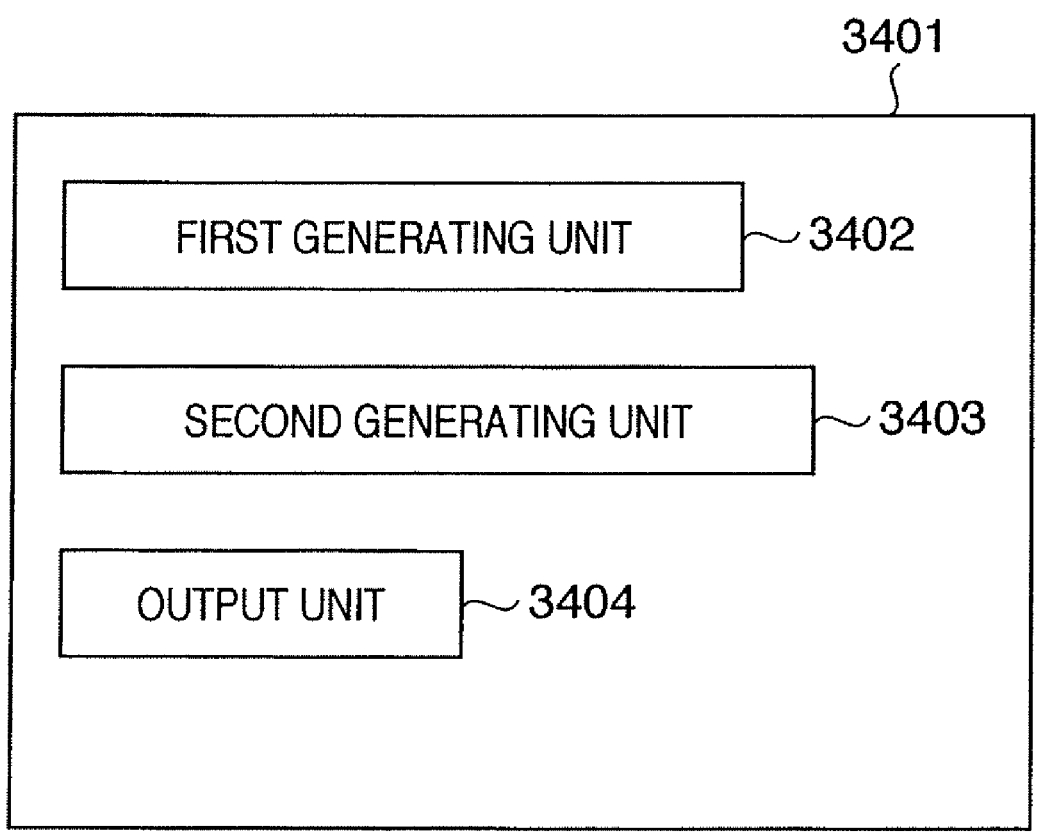
FIG. 34 is a block diagram showing an example of a job management apparatus.

FIG. 34 is a block diagram showing an example of a job management apparatus 3401. First generating unit 3402 generates a merged job by merging jobs. Second generating unit 3403 generates job management information on the basis of process content information of the merged job, and notification instruction information to transmit, to a designated destination, an end notification of a process for each of the jobs of the merged job. Output unit 3404 outputs the merged job containing the job management information to a process apparatus designated among the process apparatuses.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-131811 filed on May 10, 2006, which is hereby incorporated by reference herein in its entirety.

What is claimed is:
1. A printing system comprising a printing apparatus to perform print processing and a post processing apparatus to perform post processing for printed material obtained by the print processing in the printing apparatus, the printing apparatus comprising:
- a receiving unit configured to receive a merged job generated by merging a plurality of jobs issued from a plurality of users, wherein the merged job is handled as one job;
- a printing unit configured to perform the print processing based on the merged job received by said receiving unit; and
- a first notifying unit configured to provide, when the print processing of a job from a single user of the plurality of jobs in the merged job ends in the printing unit, a first end notification for the single user before the print processing for the merged job ends, wherein the first end notification for each of the plurality of users is provided when the print processing of the corresponding job issuing from each of the plurality of users ends in the printing unit, the post processing apparatus comprising:
- a post processing unit configured to perform post processing for the printed material of the merged job printed by the printing unit; and
- a second notifying unit configured to provide, when the post processing of the job from the single user of the plurality of jobs in the merged job ends in the post processing unit, a second end notification for the single user before the post processing for the merged job ends, wherein the second end notification for each of the plurality of users is provided when the post processing of the corresponding job issuing from each of the plurality of users ends in the post processing unit.

2. A printing system according to claim 1, further comprising:
- a generation unit configured to generate a post processing instruction for each of the plurality of jobs on the basis of contents information including a position of the contents to be printed of each of the plurality of jobs in the merged job;
- wherein the second end notification is transmitted each time the post processing apparatus ends the post processing on the basis of the post processing instruction for each of the plurality of jobs.

3. A method of controlling of a printing system comprising a printing apparatus to perform print processing and a post processing apparatus to perform post processing for printed material obtained by the printing processing in the print apparatus, the printing apparatus performing:
- a receiving step of receiving a merged job generated by merging a plurality of jobs issued from a plurality of users, wherein the merged job is handled as one job;
- a printing step of performing the print processing based on the merged job received in said receiving step; and
- a first notifying step of providing, when the print processing of a job from a single user of the plurality of jobs in the merged job ends in the printing step, a first end notification for the single user before the print processing for the merged job ends, wherein the first end notification for each of the plurality of users is provided when the print processing of the corresponding job issuing from each of the plurality of users ends in the printing step, the post processing apparatus performing:
- a post processing step of performing post processing for the printed material of the merged job printed in the printing step; and
- a second notifying step of providing, when the post processing of the job from the single user of the plurality of jobs in the merged job ends in the post processing step, a second end notification for the single user before the post processing for the merged job ends, wherein the second end notification for each of the plurality of users is provided when the post processing of the corresponding job issuing from each of the plurality of users ends in the post processing step.

4. A method according to claim 3, further comprising:
- a generation step of generating a post processing instruction for each of the plurality of jobs on the basis of contents information including a position of the contents to be printed of each of the plurality of jobs in the merged job;
- wherein the second end notification is transmitted each time the post processing apparatus ends the post processing on the basis of the post processing instruction for each of the plurality of jobs.

5. A non-transitory computer-readable storage medium storing, in executable form, a program causing a computer to execute control of a printing system comprising a printing apparatus to perform print processing and a post processing apparatus to perform post processing for printed material obtained by the print processing in the printing apparatus, the program causing the computer to execute:
- a receiving step of receiving a merged job generated by merging a plurality of jobs issued from a plurality of users, wherein the merged job is handled as one job;
- a printing step of performing the print processing based on the merged job received in said receiving step; and
- a first notifying step of providing, when the print processing of a job from a single user of the plurality of jobs in the merged job ends in the printing step, a first end notification for the single user before the print processing for the merged job ends, wherein the first end notification for each of the plurality of users is provided when the print processing of the corresponding jjob issuing from each of the plurality of users ends in the printing step;
- a post processing step of performing post processing for the printed material of the merged job printed in the printing step; and
- a second notifying step of providing, when the post processing of the job from the single user of the plurality of jobs in the merged job ends in the post processing step, a second end notification for the single user before the post processing for the merged job ends, wherein the second end notification for each of the plurality of users is provided when the post processing of the corresponding jjob issuing from each of the plurality of users ends in the post processing step.

6. A non-transitory computer-readable storage medium according to claim 5, further comprising:
- a generation step of generating a post processing instruction for each of the plurality of jobs on the basis of contents information including a position of the contents to be printed of each of the plurality of jobs in the merged job;
- wherein the second end notification is transmitted each time the post processing apparatus ends the post processing on the basis of the post processing instruction for each of the plurality of jobs.

* * * * *